(12) United States Patent
Cha et al.

(10) Patent No.: US 11,785,578 B2
(45) Date of Patent: Oct. 10, 2023

(54) POSITIONING METHOD IN WIRELESS COMMUNICATION SYSTEM, AND DEVICE SUPPORTING SAME

(71) Applicant: LG Electronics Inc., Seoul (KR)

(72) Inventors: Hyunsu Cha, Seoul (KR); Kijun Kim, Seoul (KR); Sukhyon Yoon, Seoul (KR); Woosuk Ko, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 17/422,128

(22) PCT Filed: Jan. 10, 2020

(86) PCT No.: PCT/KR2020/000478
§ 371 (c)(1),
(2) Date: Jul. 9, 2021

(87) PCT Pub. No.: WO2020/145727
PCT Pub. Date: Jul. 16, 2020

(65) Prior Publication Data
US 2022/0132463 A1     Apr. 28, 2022

Related U.S. Application Data

(60) Provisional application No. 62/791,084, filed on Jan. 11, 2019.

(51) Int. Cl.
*H04W 64/00* (2009.01)
*H04L 5/00* (2006.01)
(52) U.S. Cl.
CPC ......... *H04W 64/006* (2013.01); *H04L 5/0051* (2013.01)

(58) Field of Classification Search
CPC ....... H04W 64/00; H04W 4/02; H04W 4/021; H04W 4/46; H04W 72/0446; H04W 72/30; H04W 64/003; H04W 16/20; H04W 4/025; H04W 16/225; H04W 4/029; H04W 4/40; H04W 72/04
See application file for complete search history.

(56) References Cited

U.S. PATENT DOCUMENTS

| | | | |
|---|---|---|---|
| 2013/0285856 A1* | 10/2013 | Opshaug | G01S 5/14 342/464 |
| 2015/0327017 A1* | 11/2015 | Beauregard | G01S 13/765 455/456.6 |
| 2016/0109556 A1* | 4/2016 | Sendonaris | G01S 5/0273 455/456.1 |
| 2017/0070873 A1 | 3/2017 | Pon et al. | |
| 2018/0317111 A1 | 11/2018 | Agnihotri et al. | |

FOREIGN PATENT DOCUMENTS

| | | |
|---|---|---|
| EP | 3321709 | 5/2018 |
| WO | WO2017164925 | 9/2017 |
| WO | WO2017184040 | 10/2017 |

OTHER PUBLICATIONS

International Search Report and Written Opinion in International Appln. No. PCT/KR2020/000478, dated May 1, 2020, 16 pages (with English translation).

* cited by examiner

*Primary Examiner* — Kwasi Karikari
(74) *Attorney, Agent, or Firm* — Fish & Richardson P.C.

(57) ABSTRACT

Disclosed in various embodiments of the present disclosure are a positioning method in a wireless communication system, and a device supporting same.

13 Claims, 29 Drawing Sheets

(a)

(b)

(a)

(b)

POSITIONING METHOD IN WIRELESS COMMUNICATION SYSTEM, AND DEVICE SUPPORTING SAME

CROSS-REFERENCE TO RELATED APPLICATIONS

This application is a National Stage application under 35 U.S.C. § 371 of International Application No. PCT/KR2020/000478, filed on Jan. 10, 2020, which claims the benefit of U.S. Provisional Application No. 62/791,084, filed on Jan. 11, 2019. The disclosures of the prior applications are incorporated by reference in their entirety.

TECHNICAL FIELD

The present disclosure relates to a wireless communication system, and more particularly, to a method and apparatus for positioning in a wireless communication system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

SUMMARY

Various embodiments of the present disclosure may provide a method and apparatus for performing positioning by using radio access technology (RAT)-dependent positioning and RAT-independent positioning in combination in a wireless communication system.

Further, various embodiments of the present disclosure may provide a method and apparatus for positioning a user equipment (UE) by using sensors mounted on the UE.

Further, various embodiments of the present disclosure may provide a method and apparatus for retransmitting/transmitting a positioning reference signal (PRS) based on UE-requested resource allocation (on-demand resource allocation).

It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments of the present disclosure may provide a method and apparatus for positioning in a wireless communication system.

According to various embodiments of the present disclosure, a method of a user equipment (UE) in a wireless communication system may be provided.

According to an exemplary embodiment, the method may include receiving a first positioning reference signal (PRS), transmitting first information related to positioning of the UE based on the first PRS, and transmitting second information related to the positioning based on at least one sensor included in the UE.

According to an exemplary embodiment, the second information may be transmitted based on occurrence of at least one of predetermined events.

According to an exemplary embodiment, the predetermined events may include (i) a first event including identification of a change of a physical quantity related to a movement direction of the UE based on the at least one sensor within a predetermined time period.

According to an exemplary embodiment, the change of the physical quantity related to the movement direction of the UE may be identified based on the amount of the change of the physical quantity related to the movement direction of the UE being equal to or greater than a predetermined first threshold.

According to an exemplary embodiment, the change of the physical quantity related to the movement direction of the UE may not be identified based on the amount of the change of the physical quantity being less than the predetermined first threshold.

According to an exemplary embodiment, the predetermined events may further include (ii) a second event including identification of a change of a location of the UE based on the at least one sensor within the predetermined time period.

According to an exemplary embodiment, the change of the location of the UE may be identified based on the amount of the change of the location of the UE being equal to or greater than a predetermined second threshold.

According to an exemplary embodiment, the change of the location of the UE may not be identified based on the amount of the change of the location of the UE being less than the predetermined second threshold.

According to an exemplary embodiment, the predetermined events may further include (iii) a third event including the difference between received information about the location of the UE and information about the location of the UE obtained based on the at least one sensor being less than or equal to a predetermined third threshold.

According to an exemplary embodiment, the method may further include receiving a second PRS after receiving the first PRS, obtaining third information related to the positioning of the UE based on the second PRS, and transmitting information requesting transmission of a third PRS based on a predetermined condition related to the first information and the third information being satisfied.

According to an exemplary embodiment, the information requesting transmission of the third PRS may include at least one of (i) information requesting change of a base station or a transmission reception point (TRP) or (ii) information requesting change of a quasi co-location (QCL) configuration, According to an exemplary embodiment, the information requesting change of the BS or the TRP may be related to at least one of (i) requesting transmission of the third PRS to a BS other than a BS which has transmitted at least one of the first PRS or the second PRS or (ii) requesting transmission of the third PRS to a TRP other than a TRP which has transmitted at least one of the first PRS or the second PRS.

According to an exemplary embodiment, the information requesting change of the QCL configuration may be related to requesting transmission of the third PRS based on a QCL configuration other than at least one of a QCL configuration related to transmission of the first PRS or a QCL configuration related to transmission of the second PRS.

According to an exemplary embodiment, the predetermined condition may include (i) a first condition including the difference between the first information and the third information being less than a predetermined fourth threshold, and the amount of the change of the location of the UE from a reception time of the first PRS to a reception time of the second PRS identified based on the at least one sensor being equal to or greater than a predetermined fifth threshold, and (ii) a second condition including the difference between the first information and the third information being equal to or greater than the predetermined fourth threshold, and the amount of the change of the location of the UE from the reception time of the first PRS to the reception time of the second PRS identified based on the at least one sensor being less than the predetermined fifth threshold.

According to an exemplary embodiment, the predetermined time period may start from a reception time of the first PRS.

According to an exemplary embodiment, the method may further include receiving information requesting transmission of the second information related to a change of the location of the UE from a starting time of one of idle mode and inactive mode of the UE to a predetermined time point.

According to an exemplary embodiment, the second information may be transmitted in response to the information requesting the transmission of the second information.

According to an exemplary embodiment, the predetermined time point may be a time point at which the one mode ends.

According to various exemplary embodiments of the present disclosure, an apparatus operating in a wireless communication system may be provided.

According to an exemplary embodiment, the apparatus may include a memory and at least one processor coupled to the memory.

According to an exemplary embodiment, the at least one processor may be configured to receive a first PRS, transmit first information related to positioning of the UE based on the first PRS, and transmit second information related to the positioning based on at least one sensor included in the apparatus.

According to an exemplary embodiment, the second information may be transmitted based on occurrence of at least one of predetermined events.

According to an exemplary embodiment, the predetermined events may include (i) a first event including identification of a change of a physical quantity related to a movement direction of the UE based on the at least one sensor within a predetermined time period.

According to an exemplary embodiment, the apparatus may communicate with at least one of a UE, a network, or an autonomous driving vehicle other than a vehicle including the apparatus.

According to various embodiments of the present disclosure, an apparatus operating in a wireless communication system may be provided.

According to an exemplary embodiment, the apparatus may include at least one processor, and at least one memory storing at least one instruction which causes the at least one processor to perform a method.

According to an exemplary embodiment, the method may include receiving a first PRS, transmitting first information related to positioning of the UE based on the first PRS, and transmitting second information related to the positioning based on at least one sensor included in the apparatus.

According to an exemplary embodiment, the second information may be transmitted based on occurrence of at least one of predetermined events.

According to an exemplary embodiment, the predetermined events may include (i) a first event including identification of a change of a physical quantity related to a movement direction of the UE based on the at least one sensor within a predetermined time period.

According to various embodiments of the present disclosure, a processor-readable medium storing at least one instruction which causes at least one processor to perform a method may be provided.

According to an exemplary embodiment, the method may include receiving a first PRS, transmitting first information related to positioning of the UE based on the first PRS, and transmitting second information related to the positioning based on at least one sensor included in the apparatus.

According to an exemplary embodiment, the second information may be transmitted based on occurrence of at least one of predetermined events.

According to an exemplary embodiment, the predetermined events may include (i) a first event including identification of a change of a physical quantity related to a movement direction of the UE based on the at least one sensor within a predetermined time period.

Various embodiments of the present disclosure as described above are only some of preferred embodiments of the present disclosure, and those skilled in the art may derive and understand many embodiments in which technical features of the various embodiments of the present disclosure are reflected based on the following detailed description.

According to various embodiments of the present disclosure, the following effects may be achieved.

Various embodiments of the present disclosure may provide various methods and apparatuses for positioning a user equipment (UE), which may be performed together with a radio access technology (RAT)-dependent UE positioning method.

Further, various embodiments of the present disclosure may provide a method and apparatus for effectively positioning a UE by using RAT-dependent UE positioning and RAT-independent UE positioning in combination.

Further, various embodiments of the present disclosure may provide a method and apparatus for effectively positioning a UE by enabling UE positioning with sensors mounted on the UE.

Further, various embodiments of the present disclosure may provide a method and apparatus for increasing matchability between a UE and a positioning reference signal (PRS) by providing a method of a UE for requesting a PRS retransmission/transmission when a specific condition is satisfied.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
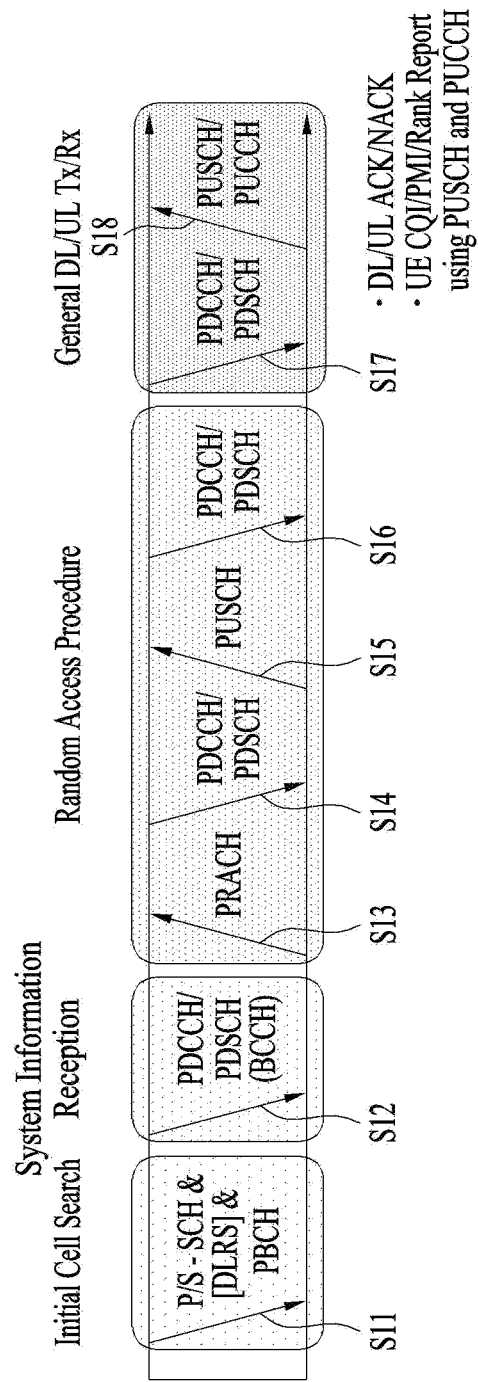
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). ABS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard documents disclosed in at least one of wireless access systems including an IEEE 802.xx system, a 3rd generation partnership project (3GPP) system, a 3GPP LTE system, a 3GPP 5G NR system, and a 3GPP2 system. Particularly, various embodiments of the present disclosure may be supported by technical specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321, and 3GPP TS 38.331. That is, the above documents may be referred to for obvious steps or parts which are not described in various embodiments of the present disclosure. Further, all terms used herein may be described by the standard documents.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
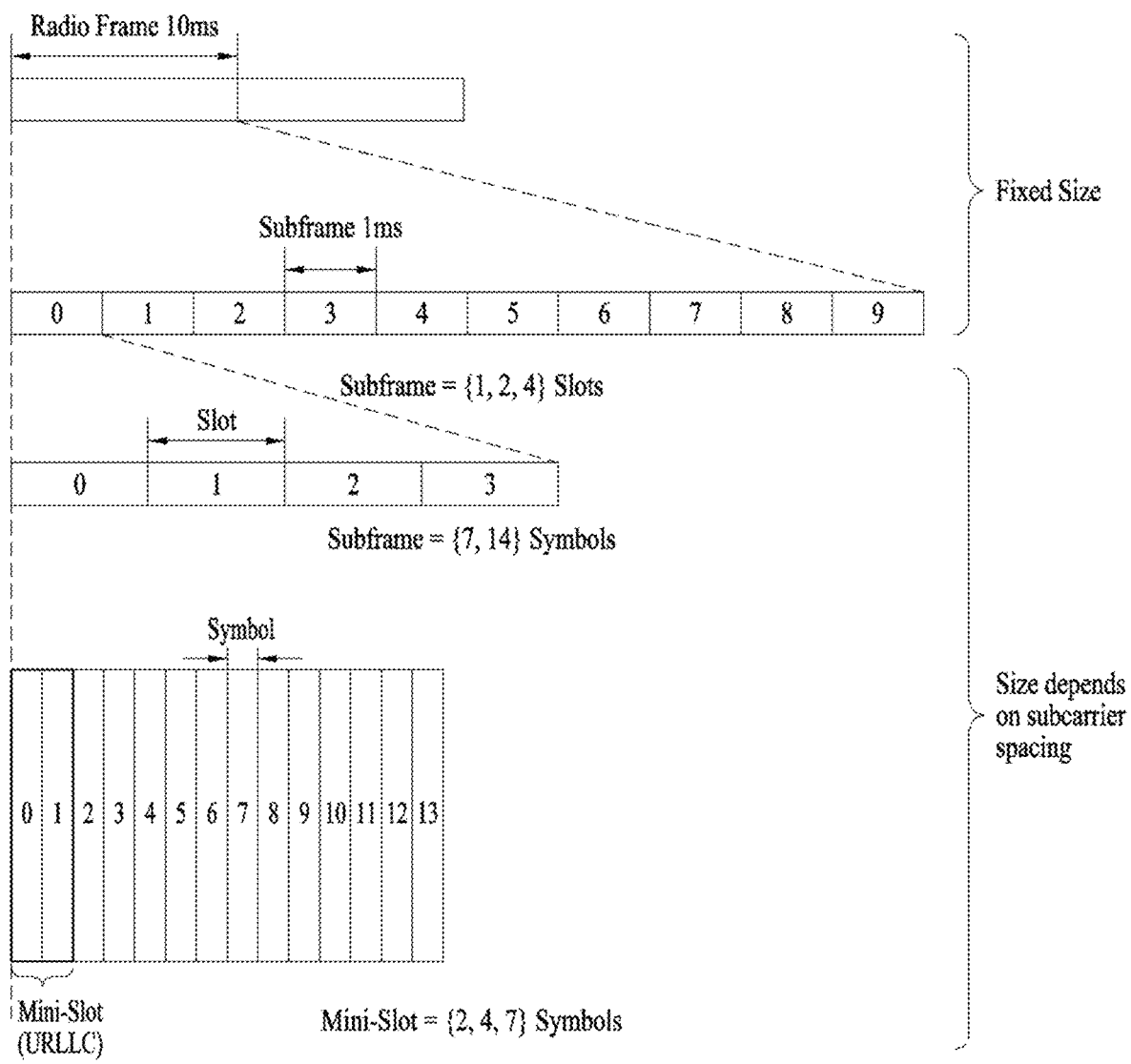
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology, $\mu$, slots are numbered with $n_s^{\mu} \in \{0, \ldots, N^{slot,\mu}_{frame}-1\}$ in an increasing order in a subframe, and with $n^{\mu}_{s,f} \in \{0, \ldots, N^{slot,\mu}_{subframe}-1\}$ in an increasing order in a radio frame. One slot includes $N^{\mu}_{symb}$ consecutive OFDM symbols, and $N^{\mu}_{symb}$ depends on a CP. The start of a slot $n_s^{\mu}$ in a subframe is aligned in time with the start of an OFDM symbol $n^{\mu}_s * N^{\mu}_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with $\mu=2$ (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
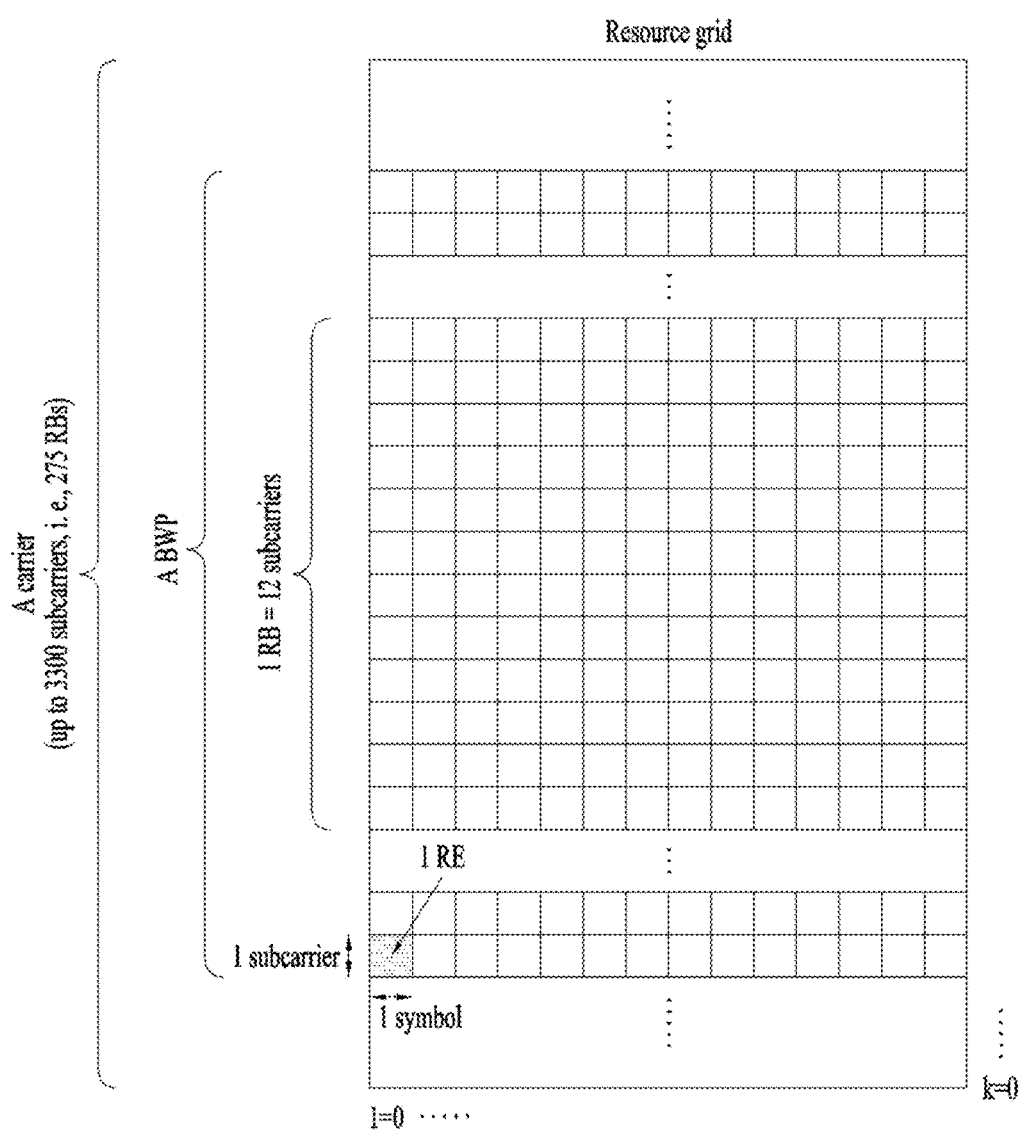
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
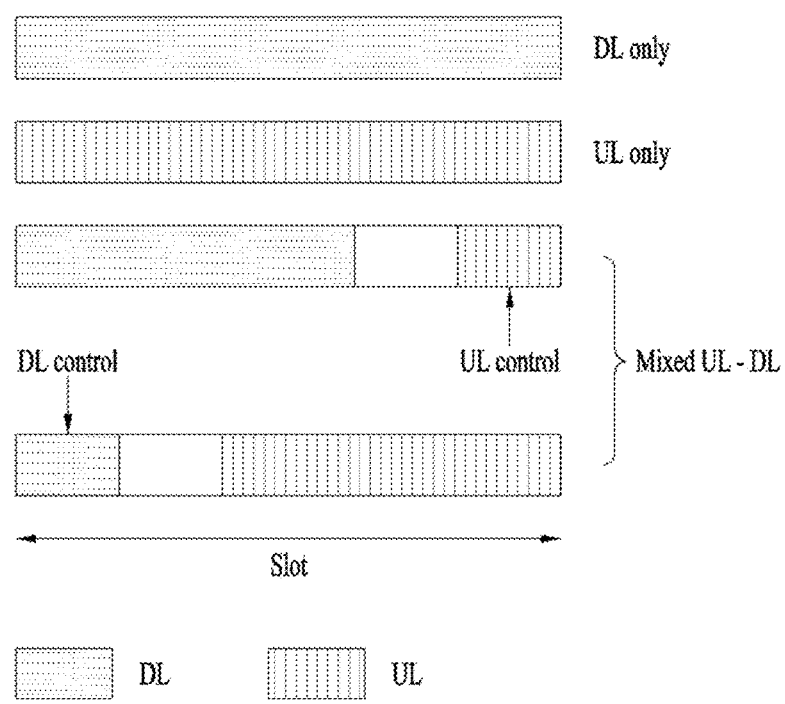
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
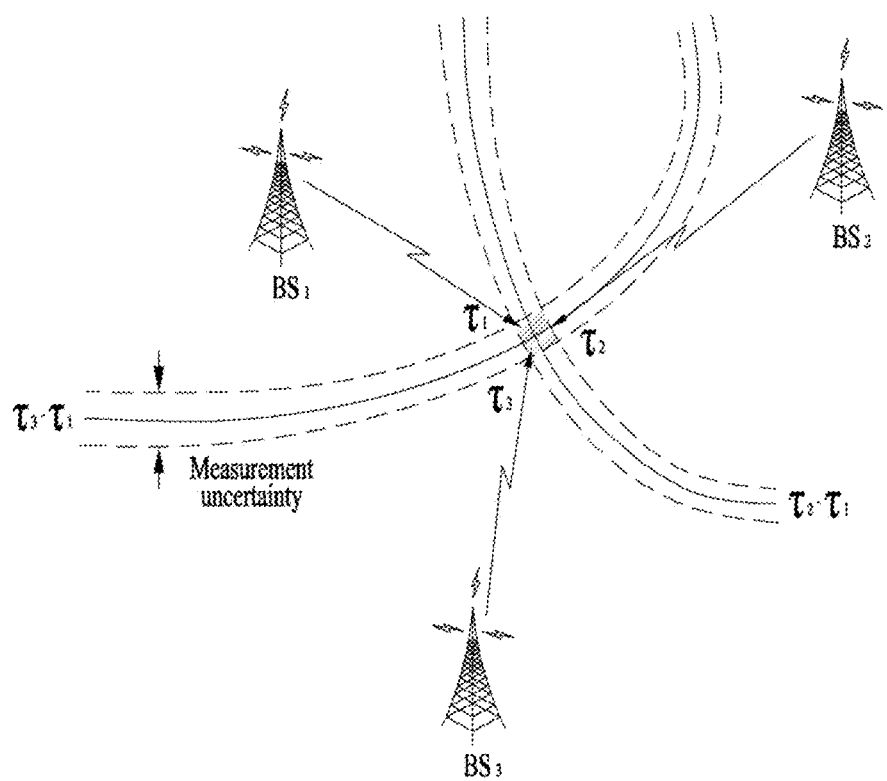
FIG. 12 is a diagram illustrating an observed time difference of arrival (OTDOA) positioning method, to which various embodiments are applicable.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM)

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level)

waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 7-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell Search

Figure 5:
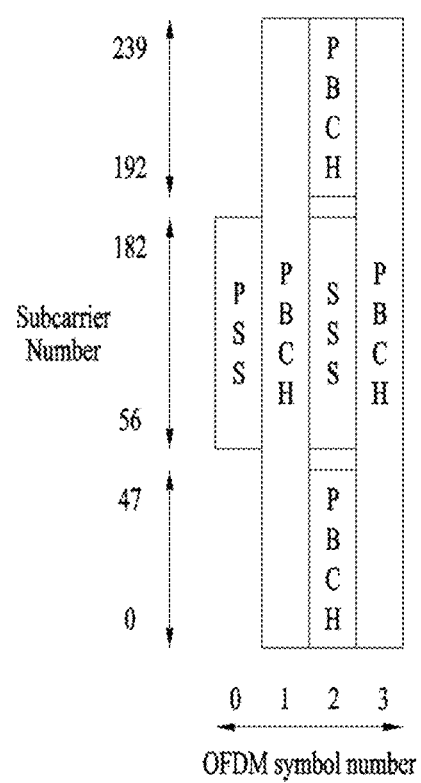
FIG. 5 is a diagram illustrating a synchronization signal block (SSB) structure to which various embodiments of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, and so on based on an SSB.

Referring to FIG. 5, the SSB includes a PSS, an SSS, and a PBCH. The SSB includes four consecutive OFDM symbols, and the PSS, the PBCH, the SSS/PBCH, and the PBCH are transmitted in the respective OFDM symbols. Each of the PSS and the SSS includes one OFDM symbol by 127 subcarriers, and the PBCH includes three OFDM symbols by 576 subcarriers. Polar coding and QPSK are applied to the PBCH. The PBCH includes data REs and demodulation reference signal (DMRS) REs in every OFDM symbol. There are three DMRS REs per RB, with three data REs between every two adjacent DMRS REs.

Cell search is a process of acquiring time/frequency synchronization with a cell and detecting the identifier (ID) (e.g., physical cell ID (PCID)) of the cell. The PSS is used to detect a cell ID in a cell ID group, and the SSS is used to detect the cell ID group. The PBCH is used to detect an SSB (time) index and a half-frame.

The cell search process of the UE may be summarized in Table 8.

TABLE 8

| Type of Signals | | Operations |
|---|---|---|
| 1$^{st}$ step | PSS | * SS/PBCH block (SSB) symbol timing acquisition<br>* Cell ID detection within a cell ID group (3 hypothesis) |
| 2$^{nd}$ Step | SSS | * Cell ID group detection (336 hypothesis) |
| 3$^{rd}$ Step | PBCH DMRS | * SSB index and Half frame (HF) index (Slot and frame boundary detection) |
| 4$^{th}$ Step | PBCH | * Time information (80 ms, System Frame Number (SFN), SSB index, HF)<br>* Remaining Minimum System Information (RMSI) Control resource set (CORESET)/Search space configuration |
| 5$^{th}$ Step | PDCCH and PDSCH | * Cell access information<br>* RACH configuration |

There may be 336 cell ID groups, each including three cell IDs. There may be 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
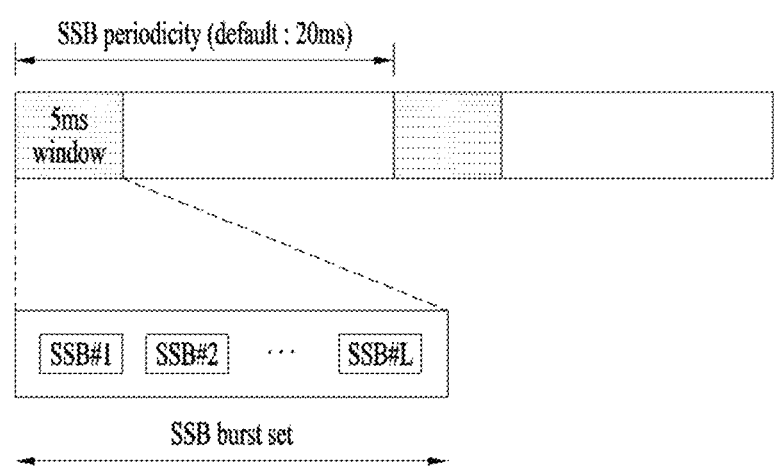
FIG. 6 is a diagram illustrating an exemplary SSB transmission method to which various embodiments of the present disclosure are applicable.

FIG. 6 is an exemplary SSB transmission method to which various embodiments of the present disclosure are applicable.

Referring to FIG. 6, an SSB is periodically transmitted according to an SSB periodicity. A basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured in a 5-ms time window (i.e., half-frame), and an SSB may be repeatedly transmitted up to L times within the SS burst set. The maximum number L of transmissions of the SSB may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in temporal order within the SSB burst set (i.e., half-frame).

Case A: 15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.
  Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

1.5. QCL (Quasi Co-Located or Quasi Co-Location)

In various embodiments of the present disclosure, QCL may mean one of the followings.

(1) If two antenna ports are QCLed, the UE may assume that large-scale properties of a signal received from a first antenna port may be inferred from a signal received from the other antenna port. The "large-scale properties" may include one or more of the followings Delay spread Doppler spread Frequency shift Average received power Received Timing (2) If two antenna ports are QCLed, the UE may assume that large-scale properties of a channel over which a symbol on one antenna port is conveyed may be inferred from a channel over which a symbol on the other antenna port is conveyed. The "large-scale properties" may include one or more of the followings Delay spread Doppler spread Doppler shift Average gain Average delay Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).

Angular spread (AS): When it is said that QCL is guaranteed between antenna ports in terms of AS, this may imply that an AS estimated from one antenna port may be derived/estimated/applied from an AS estimated from another antenna port.

Power Angle (-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE.

2.1. Positioning Reference Signal (PRS) in LTE System

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor 2^{10} \cdot (7 \cdot (n_s+1)+l+1) \cdot (2 \cdot (N_{IS}^{PRS} \bmod 512)+1)+2 \cdot (N_{ID}^{PRS} \bmod 512)+N_{CP} \quad \text{[Equation 2]}$$

Unless additionally configured by higher layers, $NA_{ID}^{PRS}$ is equal to $N_{ID}^{cell}$, and $N_{CP}$ is 1 for a normal CP and 0 for an extended CP.

Figure 7:
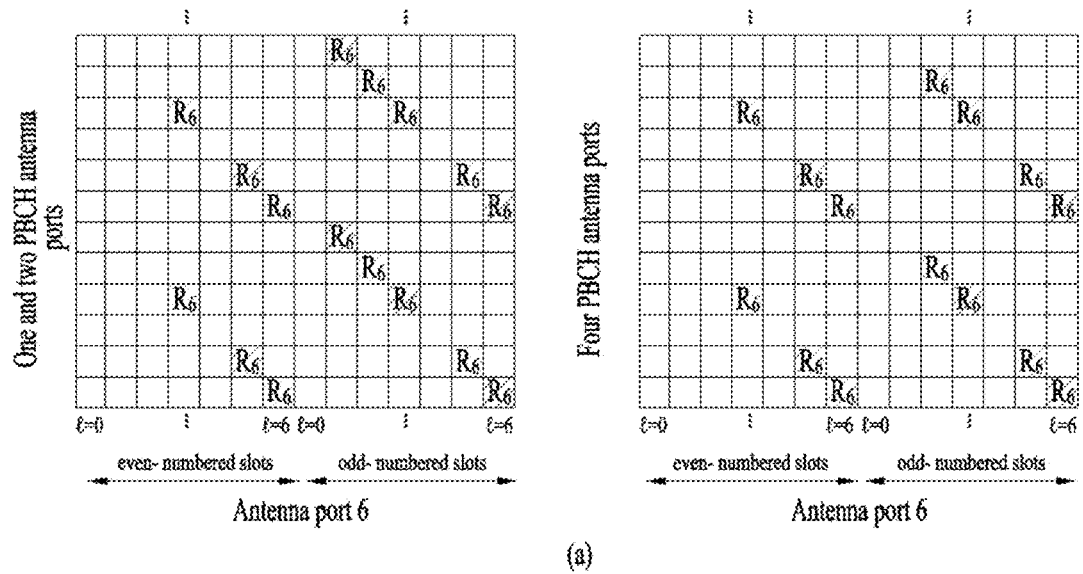
FIG. 7 illustrates exemplary mapping of a positioning reference signal (PRS) in a long term evolution (LTE) system to which various embodiments of the present disclosure are applicable.
Figure 7:
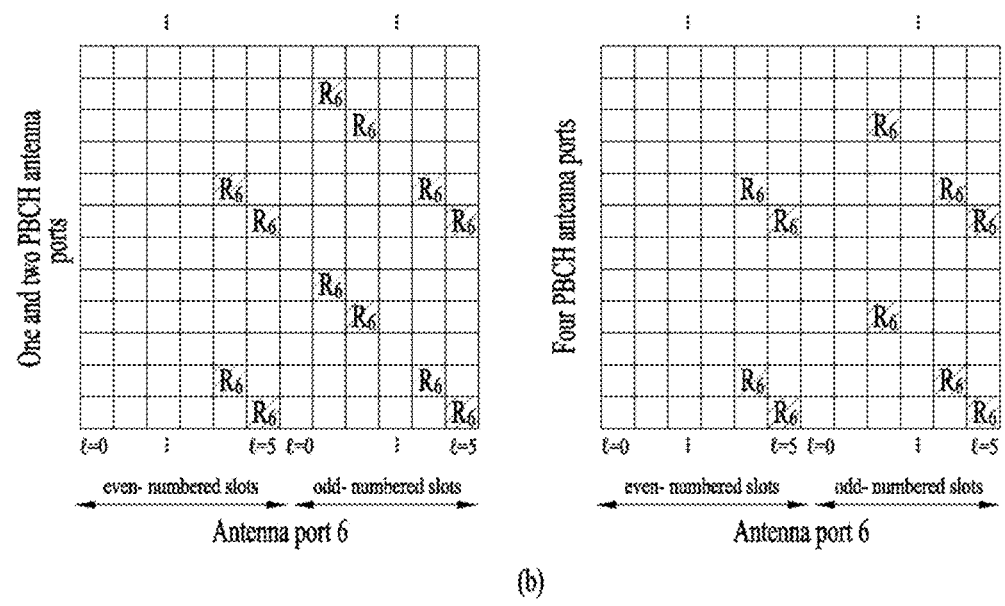

FIG. 7 illustrates an exemplary pattern to which a PRS is mapped in a subframe.

As illustrated in FIG. 7, the PRS may be transmitted through an antenna port 6. FIG. 7(a) illustrates mapping of the PRS in the normal CP and FIG. 7(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 9 below.

TABLE 9

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-2404 | 5 | $I_{PRS} - 2400$ |
| 2405-2414 | 10 | $I_{PRS} - 2405$ |
| 2415-2434 | 20 | $I_{PRS} - 2415$ |
| 2435-2474 | 40 | $I_{PRS} - 2435$ |
| 2475-2554 | 80 | $I_{PRS} - 2475$ |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.2. UE Positioning Architecture in NR system

Figure 8:
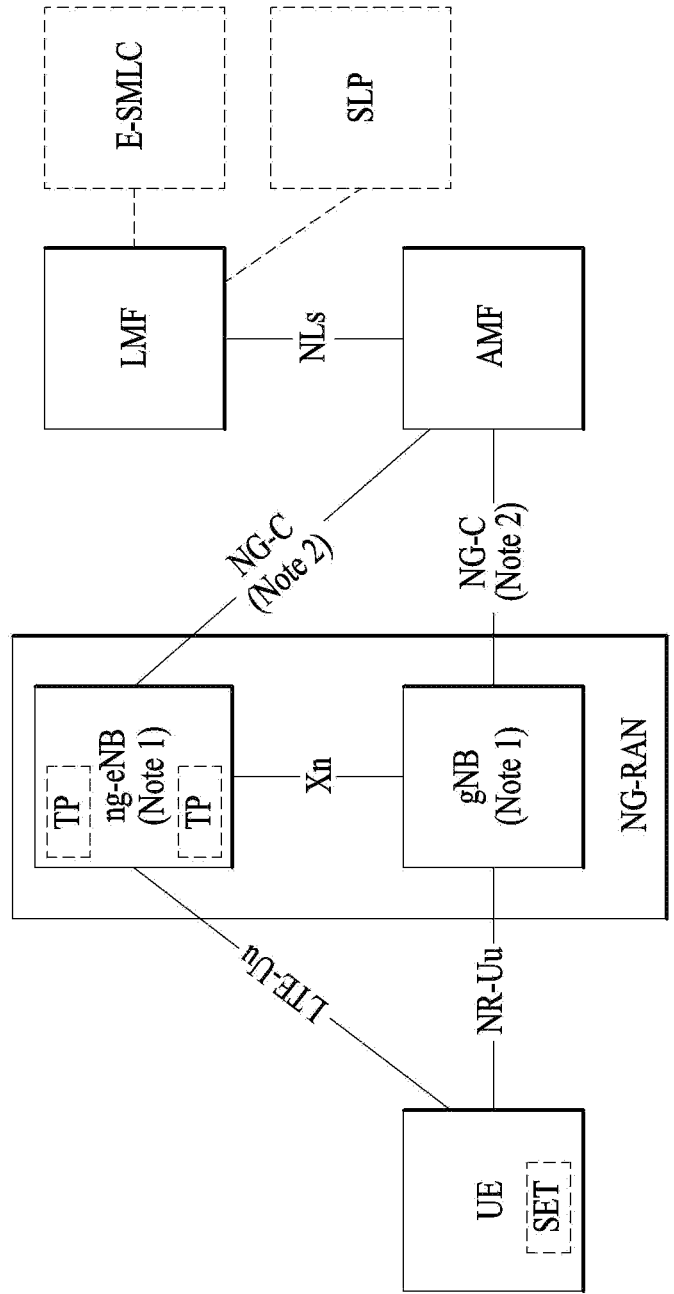
FIG. 8 is a diagram illustrating an example of an architecture of a system for positioning a user equipment (UE) to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LWF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.3. Operation for UE Positioning

Figure 9:
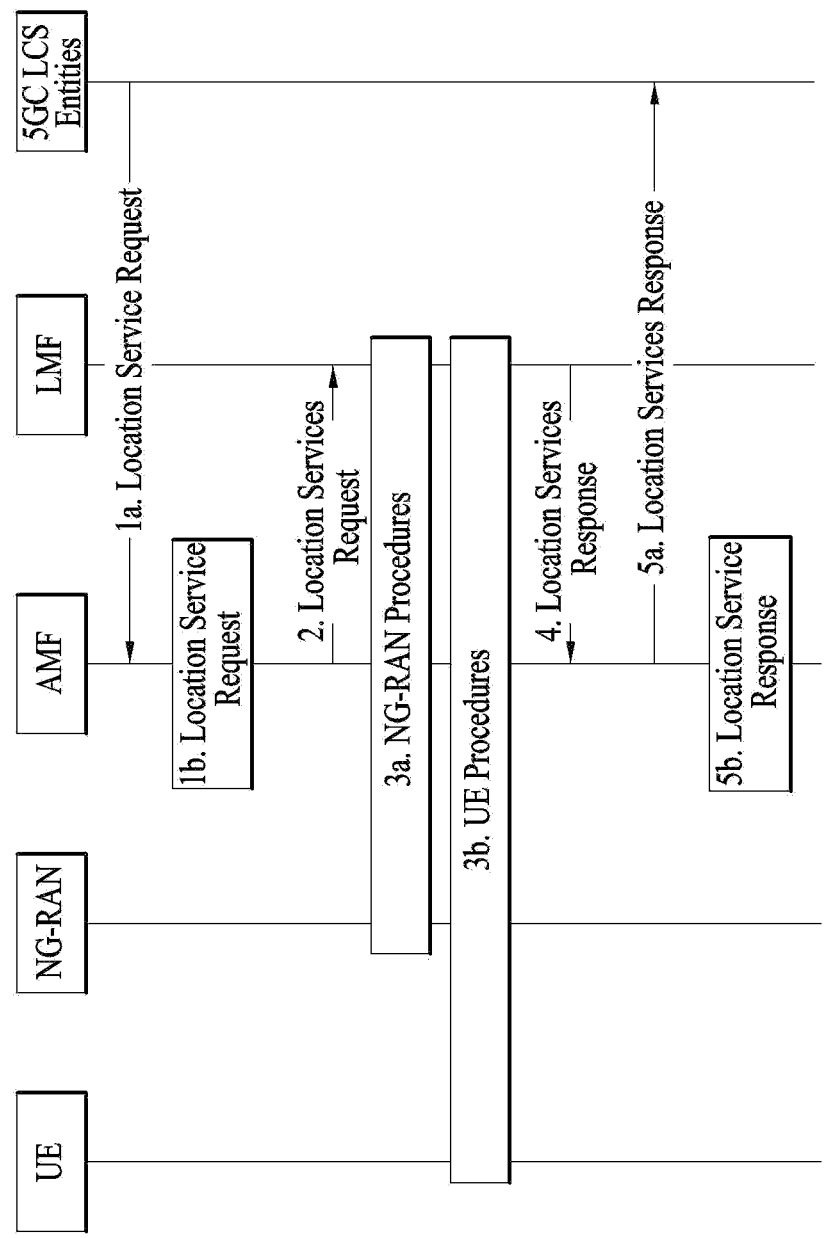
FIG. 9 is a diagram illustrating an example of a procedure of positioning a UE to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LWF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.4. Positioning Protocol 2.4.1. LTE Positioning Protocol (LPP)

Figure 10:
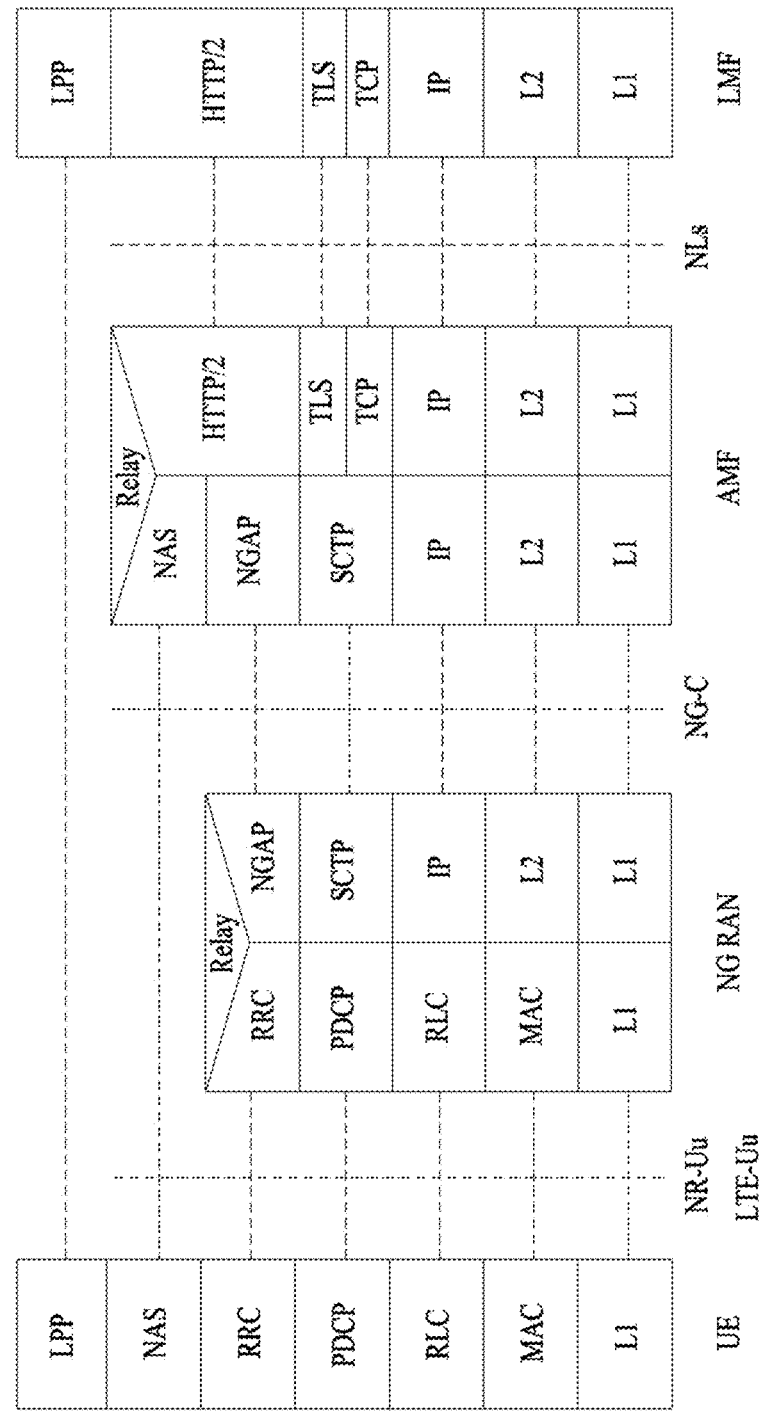
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.4.2. NR Positioning Protocol A (NRPPa)

Figure 11:
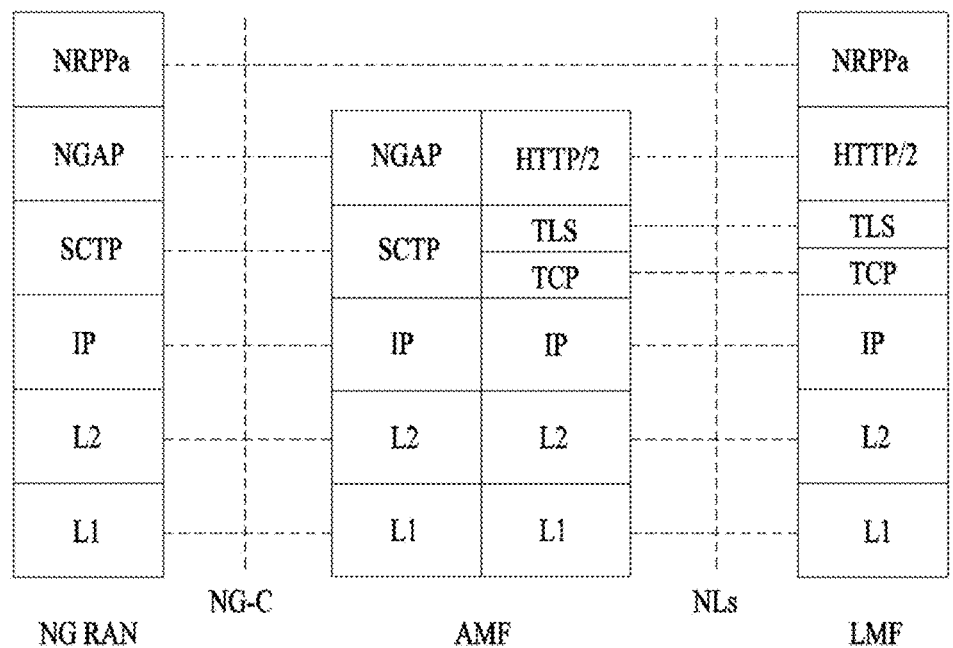
FIG. 11 is a diagram illustrating protocol layers for supporting NR positioning protocol a (NRPPa) protocol data unit (PDU) transmission, to which various embodiments are applicable.

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.5. Positioning Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.5.1. Observed Time Difference Of Arrival (OTDOA)

FIG. 12 is a view illustrating an OTDOA positioning method.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i$-$T_1)$ is a transmission time offset between two TPs, referred to as "real time differences" (RTDs), and $n_i$ and $n_1$ are UE ToA measurement error values.

2.5.2. Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.5.3. Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

AOA (AoA): angle of arrival
CSI-RS: channel state information reference signal
ECID: enhanced cell identifier
GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal
RTT: round trip time
RSTD: reference signal timing difference
SRS: sounding reference signal
TDOA (TDoA): timing difference of arrival
TOA (ToA): time of arrival
TRP: transmission reception point
UTDOA (UTDoA): uplink timing difference of arrival As more and more communication devices have demanded larger communication traffic along with the trend of the times, the next-generation wireless broadband communication system improved from the LTE system, 5G is required. The next-generation 5G system is called new RAT (NR), for convenience.

With the introduction of the NR system, the usefulness of joint utilization between measurement information obtained by UE sensor-based positioning and measurement information obtained by RAT-dependent positioning is under discussion.

Various embodiments of the present disclosure may provide various UE positioning methods which may be used together with an RAT-dependent UE positioning method.

Various embodiments of the present disclosure may provide a method of effectively positioning a UE by using RAT-dependent UE positioning and RAT-independent UE positioning in combination.

Various embodiments of the present disclosure may provide a method of effectively positioning a UE by enabling UE positioning with sensors mounted on a UE.

For example, the sensors mounted on the UE may be effectively used for an RAT-dependent NR positioning method such as multi-cell ECID, OTDOA, and so on.

Figure 13:
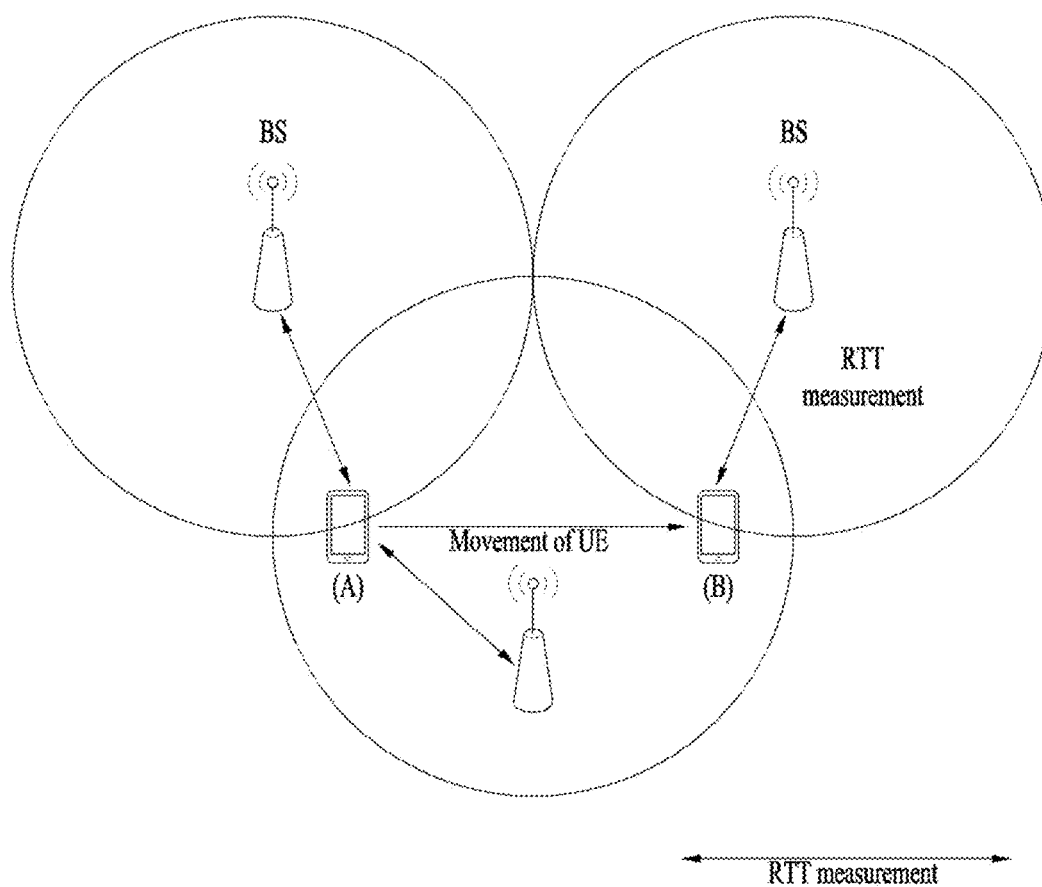
FIG. 13 is a diagram illustrating an exemplary positioning technique according to various embodiments of the present disclosure.

FIG. 13 is a diagram illustrating an exemplary positioning technique according to various embodiments of the present disclosure. More specifically, FIG. 13 illustrates an example of a UE sensors-aided multi-cell RTT.

Referring to FIG. 13, for example, a UE may move from (A) to (B).

For example, it is assumed that when the UE transmits a UL RS at (A) and (B), an LMF may estimate an RTT, but only two BSs are capable of receiving the UL RS transmitted by the UE at (A).

Under the assumption, for example, one more RTT measurement may be required to estimate the location of the UE. The additional RTT measurement may be obtained from the UE at (B).

For example, the UE at (B) may be indicated to report location information changed during a specific time period to the LMF.

In another example, when the location of the UE may be estimated at (A) and (B) by a multi-cell RTT, location change information obtained from sensors of the UE may also be used to improve a positioning accuracy. For example, the location change information obtained from the sensors of the UE may be used as an additional measurement for estimating the location of the UE.

Figure 14:
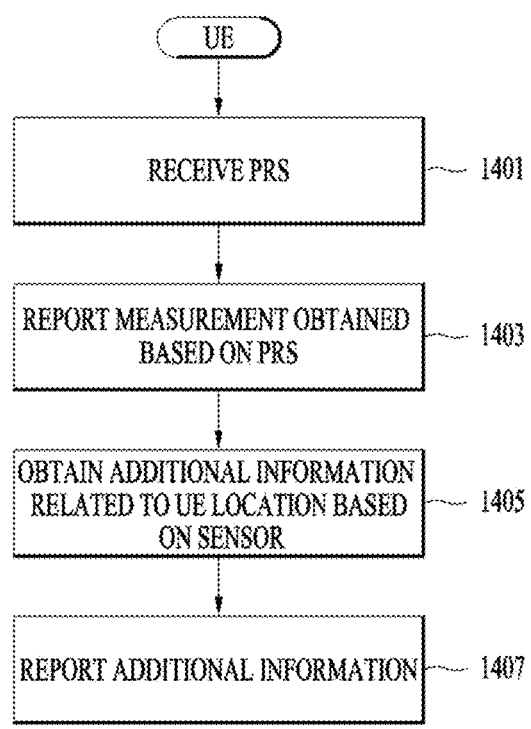
FIG. 14 is a diagram illustrating an exemplary UE operation according to various embodiments of the present disclosure.

FIG. 14 is a flowchart illustrating an exemplary UE operation according to various embodiments of the present disclosure.

For example, a network node may be, but not limited to, a BS and/or an LMF and/or a location server.

For example, in the description of various embodiments of the present disclosure, the location server may be a specific BS responsible for wireless positioning or an entity responsible for positioning, independent of a specific BS.

Referring to FIG. 14, the UE may receive a positioning reference signal (PRS) from a transmission reception point (TRP) and/or a BS and/or a cell in operation 1401 according to an exemplary embodiment.

In operation 1403 according to an exemplary embodiment, the UE may report (information related to the location of the UE based on) a measurement (e.g., TOA, RSTD, or AOA) from the received PRS to the BS and/or the LMF and/or the location server.

In operation 1405 according to an exemplary embodiment, the UE may obtain additional information related to the location of the UE based on one or more sensors mounted on the UE in operation 1405 according to an exemplary embodiment. For example, the type of the obtained additional information and/or a measurement condition for obtaining the additional information and/or a measurement time period and/or a measurement periodicity and/or a measurement time may be based on the following various embodiments of the present disclosure.

In operation 1407 according to an exemplary embodiment, the UE may report the additional information to the BS and/or the LMF and/or the location server.

For example, operation 1405 and/or operation 1407 may be performed simultaneously with operation 1401 and/or operation 1403 in FIG. 14.

Various embodiments of the present disclosure will be described in detail. Those skilled in the art will clearly understand that all or some of the various embodiments of the present disclosure described below may be combined into other various embodiments of the present disclosure, unless contradicting each other.

3.1. [Proposal #00]—Method of using sensors of UE

Operations of proposal #00 according to various embodiments of the present disclosure will be described in detail. Those skilled in the art will clearly understand that all or some of the various embodiments of the present disclosure described below may be combined into other various embodiments of the present disclosure, unless contradicting each other.

According to various embodiments of the present disclosure, the BS and/or the LMF and/or the location server may use an RAT-dependent technique and an RAT-independent technique, for UE positioning.

For example, the RAT-dependent technique may refer to a positioning technique performed dependently on a cellular network.

For example, the RAT-independent technique may refer to a positioning technique performed based on a device and/or signal independent of the cellular network.

For example, the UE may measure the posture and/or angle of the UE (e.g., the landscape mode/portrait mode, and the angle of the UE with respect to a specific reference), a direction in which the UE moves, a moved distance, and/or an acceleration by using sensors (e.g., a gyro sensor, a motion sensor, an acceleration sensor, a magnetic force sensor, and so on) included in the UE. For example, the angle of the UE may be an angle based on relative and/or absolute coordinates, for example, an angle with respect to the ground, an angle with respect to a normal to the ground, or the like.

For example, the UE may report the measurement information (i.e., information about at least one of the posture and/or angle of the UE, the direction in which the UE moves, the moved distance, or the acceleration of the UE) to the BS and/or the LMF and/or the location server.

For example, the measurement information may help the BS and/or the LMF and/or the location server to effectively measure/track the location of the UE.

For example, it is assumed that the UE is located indoors. In this case, it may not be easy for the UE to determine current location information about the UE by using a global positioning system (GPS) and/or a global navigation satellite system (GNSS).

In this case, for example, the UE may count the number of steps and/or identify a direction by using the sensors mounted on the UE (e.g., a smartphone), and thus determine the movement direction and/or distance for a specific time period.

According to various embodiments of the present disclosure, appropriate utilization of the sensors mounted on the UE may be helpful for the BS and/or the LMF and/or the location server to effectively measure/estimate/calculate the location of the UE.

For example, the BS and/or the LMF and/or the location server may select and/or use a UE positioning technique in consideration of the presence or absence of sensor(s) mounted on the UE (e.g., whether specific sensor(s) is mounted on the UE).

For example, the UE may report, to the BS and/or the LMF and/or the location server, information about whether one or more of specific devices are mounted by UE capability signaling. For example, the specific devices may include a gyro sensor, a motion sensor, an acceleration sensor, a magnetic force sensor, an image sensor, a camera, and so on.

For example, the UE may report, to the BS and/or the LMF and/or the location server, information about whether to measure and/or report information about a location change between specific time points by the UE capability signaling.

For example, the BS and/or the LMF and/or the location server may indicate to and/or configure the UE to report at least one of the direction and/or speed and/or acceleration and/or movement distance and/or direction information (e.g., an azimuth angle) of a current movement of the UE based on the location of the UE at a time of measurement using an RAT-dependent technique such as OTDOA or UTDOA, and an RAT-independent technique using the GPS and/or the GNSS, and track/estimate/calculate/estimate the location of the UE based on the report.

For example, the BS and/or the LMF and/or the location server may configure/indicate to/instruct the UE to perform the above reporting periodically/aperiodically/semi-persistently.

For example, the reporting of the UE may continue until before the BS and/or the LMF and/or the location server configures/indicates to the UE to discontinue the reporting.

For example, when the BS and/or the LMF and/or the location server indicates to the UE to report information about a movement distance and/or direction to the UE, the BS and/or the LMF and/or the location server may also indicate to the UE to report a movement distance and/or direction during a specific time stamp.

For example, the movement direction of the UE may include a z axis (height). That is, for example, the movement direction of the UE may be an x-axis (horizontal) direction and/or a y-axis (horizontal) direction and/or a z-axis (vertical) direction.

Further, for example, the BS and/or the LMF and/or the location server may configure/indicate to/instruct the UE to report information about one or more of a movement direction and/or a speed and/or an acceleration and/or an inclination and/or an angle (an inclination and/or an angle and/or an orientation with respect to at least one of the x, y, and z axes).

Further, for example, the BS and/or the LMF and/or the location server may configure/indicate to/instruct the UE to report a measurement (e.g., RSTD, TOA, or AOA) obtained from a PRS together with information about one or more of a movement direction and/or a speed and/or an acceleration and/or an inclination and/or an angle (an inclination and/or an angle and/or an orientation with respect to at least one of the x, y, and z axes) which is obtained from the sensors of the UE.

Figure 15:
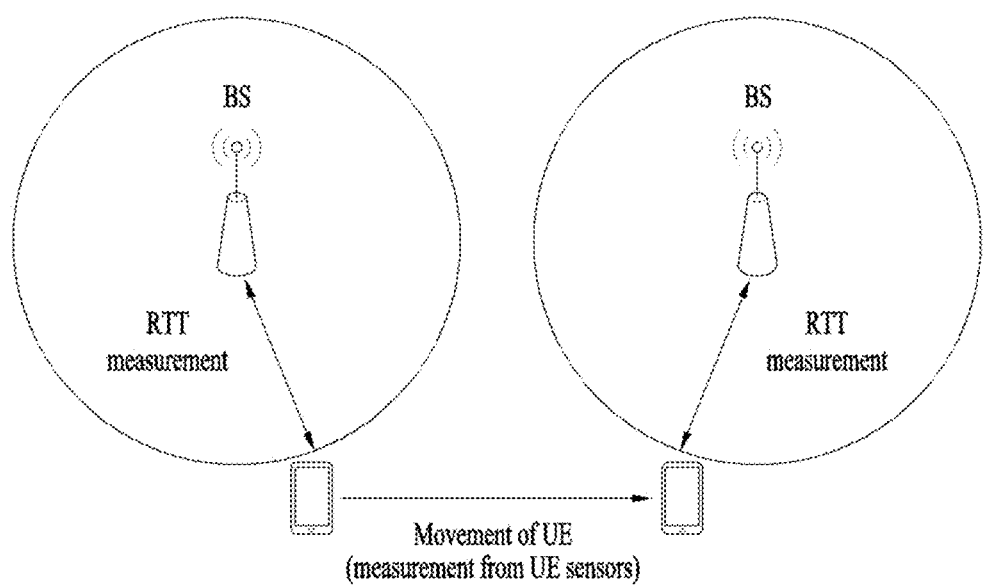
FIG. 15 is a diagram illustrating an exemplary positioning technique according to various embodiments of the present disclosure.

FIG. 15 is a diagram illustrating a positioning technique according to various embodiments of the present disclosure.

For example, referring to FIG. 15, the UE may transmit a UL PRS and/or sounding reference signal (SRS) and/or receive a DL RS to measure an RTT with a specific TRP and/or BS and/or cell at a specific time and/or location. Then, for example, the UE may move to a specific location and perform an RTT measurement with another TRP and/or BS and/or cell.

For example, the UE may measure a location and/or coordinates and/or a movement distance and/or a direction of the UE which has been changed between different time points for RTT measurements with different TRPs and/or BSs and/or cells, with the sensors mounted on the UE.

For example, the UE may be configured/indicated to/instructed to report, to the BS and/or the LMF and/or the location server, information about one or more of a location (e.g., absolute or relative coordinates) and/or a distance and/or a direction (e.g., an azimuth angle) and/or a speed, which is related to movement of the UE between different RTT measurement time points.

For example, the BS and/or the LMF and/or the location server may configure/indicate to/instruct the UE to measure and/or report the information between RTT measurement time points by using the sensors mounted on the UE.

For example, when the UE transmits a specific UL RS (e.g., SRS) for RTT measurement with a specific BS and/or LMF and/or location server, the UE may also report information about a location change (e.g., a movement distance, a direction, and so on) from a previous time of RTT measurement with the a specific BS and/or LMF and/or location server to a current time.

And/or, for example, the BS and/or LMF and/or location server may configure/indicate to/instruct the UE to perform the operation.

And/or, for example, the UE may transmit, at the current time, a UL RS together with information about a location change from a specific time when the UE transmitted a specific UL RS (e.g., SRS) to a specific BS and/or LMF and/or location server, for RTT measurement to a current time (e.g., a transmission time of a UL RS for UE positioning and/or a reception time of a DL RS).

For example, the reported information may be used for UE positioning. This may advantageously enable more precise UE positioning than based on the assumption that the UE is located at a fixed place during an RTT measurement time.

In another example, along with the OTDOA and/or UTDOA technique for estimating the location of the UE by using a PRS, the UE may be positioned more precisely by using information obtained through the sensors of the UE.

For example, when it is possible for the UE to be provided with the location of the UE measured by the PRS, it is assumed that the UE has been provided with the location of the UE measured by the PRS transmitted at a specific time (e.g., the latest received PRS).

Under the assumption, for example, the UE may calculate/estimate/measure a distance and/or direction for which and/or in which the UE has moved until receiving the PRS later by using the sensors of the UE. For example, because the UE was provided with the location of the UE measured by the PRS received at a previous time, the UE may calculate a relative location change until the next PRS reception and calculate the absolute location of the UE (in consideration of the location change along with the provided location). That is, for example, the UE may calculate the absolute location of the UE by adding the relative location change to the absolute location of the UE measured by the provided PRS and/or correcting the absolute location of the UE with the relative location change.

That is, for example, the BS and/or the LMF and/or the location server may transmit, to the UE, information about the location of the UE measured/estimated/calculated at a specific time (e.g., location information obtained based on a previous PRS transmission).

For example, the BS and/or the LMF and/or the location server may then configure/indicate to/instruct the UE to report the location of the UE at a specific time (e.g., the next PRS transmission (and/or reception) time).

For example, the location of the UE may be the absolute location and/or relative location of the UE. For example, the location of the UE may conceptually cover a height. That is, for example, the location of the UE may be an x-axis (horizontal) location and/or a y-axis (horizontal) location and/or a z-axis (vertical) location.

According to the above-described exemplary embodiment, positioning accuracy may be increased by measuring the location of the UE by using the sensors of the UE in addition to measurement of the location of the UE based on the PRS (performed by the BS and/or the LMF and/or the location server).

In another example, the UE sensor-based positioning method according to various embodiments of the present disclosure may also reduce PRS overhead.

For example, particularly in a system in which a transmitting end and/or a receiving end transmits/receives a PRS while performing a transmission (TX)/reception (RX) beam sweeping operation several times based on a narrow beam, the overhead of time/frequency resources used for PRS transmission/reception may be large in receiving PRSs from many TRPs and/or BSs and/or cells to obtain many measurements.

According to an exemplary embodiment, once the BS and/or the LMF and/or the location server identifies the location of the UE fairly accurately/precisely through a wideband PRS, the BS and/or the LMF and/or the location server may receive a report of a location change of the UE (e.g., an absolute location change, a relative location change, a movement distance, a movement direction, a movement speed, and so on) and determine the location of the UE based on the report.

For example, while the BS and/or the LMF and/or the location server should continuously determine the location of the UE fairly accurately/precisely in some cases, once the BS and/or the LMF and/or the location server identifies the accurate location, the BS and/or the LMF and/or the location server may have only to identify whether the location of the UE has been changed significantly (e.g., a change in at least one of the absolute location, the relative location, the movement distance, the movement direction, the movement speed, and so one is greater than a predetermined threshold) in other cases.

Accordingly, for example, the BS and/or the LMF and/or the location server may locate the UE once in the RAT-dependent positioning technique for high-accuracy positioning, and then identify/estimate/track the location of the UE based on information about a location change obtained by using the sensors of the UE. That is, for example, the BS and/or the LMF and/or the location server may identify/estimate/track the location of the UE by adding the location change to the previously identified location of the UE and/or correcting the previously identified location of the UE with the location change.

For example, the operation of reporting information about a location change obtained from the sensors of the UE between different PRS reception time points by the UE may start at a time when the UE receives a specific PRS with almost no mobility.

For example, the mobility may be set/defined as a specific threshold value(s) of a speed in a specific direction.

Alternatively, for example, the mobility may be set/defined as a change in the relative location of the UE for a specific time (e.g., whether the UE is within a specific area).

For example, the UE receives the PRS at time A, B, and C (A<B<C) (e.g., the time may span a few seconds or more during which the UE receives all of PRSs from a plurality of TRPs and/or BSs and/or cells). When the UE has almost no mobility at time A and a large mobility at time B, the UE may start to obtain/report information about a location change from the sensors of the UE, at time A.

For example, the BS and/or the LMF and/or the location server may indicate/configure/set a time for obtaining a measurement from the sensors of the UE to the UE or the UE may autonomously start to obtain a measurement from the sensors of the UE without receiving a separate indication/configuration.

In another example, the UE sensor-based positioning method according to various embodiments of the present disclosure may be used to identify and/or track the location of the UE in idle/inactive mode as well as in (RRC) connected mode.

Figure 16:
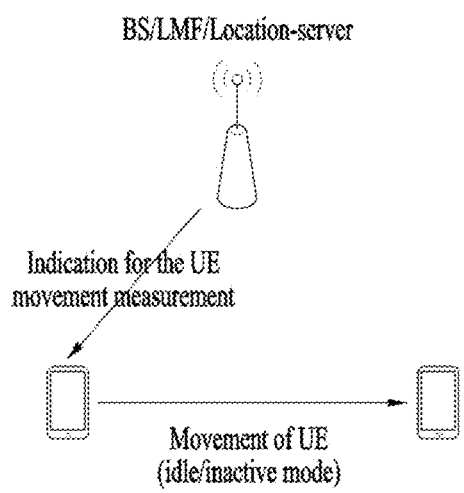
FIG. 16 is a diagram illustrating an exemplary positioning technique according to various embodiments of the present disclosure.

FIG. 16 is a diagram illustrating a positioning technique for positioning an idle/inactive-mode UE according to various embodiments of the present disclosure.

Referring to FIG. 16, for example, the BS and/or the LMF and/or the location server may configure/indicate to/instruct the UE to measure a location change up to a specific time point and report information about the location change (indication for the UE movement measurement), when the UE enters the idle/inactive mode. For example, as the idle/inactive-mode UE moves until the specific time point, the idle/inactive-mode UE may report the information about the location change from the starting time of the idle/inactive mode to the specific time point to the BS and/or the LMF and/or the location server.

For example, the BS and/or the LMF and/or the location server may configure/indicate to/instruct the UE to measure and/or report the location change from the starting time of the idle/inactive mode of the UE to the specific time point (e.g., the ending time of the idle/inactive mode of the UE, a reception time of the first PRS after the end of the idle/inactive mode of the UE, or a time when the idle-mode UE wakes up for a while to monitor and/or receive a paging signal).

In another example, the BS and/or the LMF and/or the location server may indicate/configure/set only a time when the UE is to start a measurement on a location change with the sensors of the UE, without indicating a specific time point when the UE is to measure/report the location change with the sensors of the UE.

In another example, the BS and/or the LMF and/or the location server may then indicate to the UE that the UE does not need to perform the measurement using the sensors to measure/estimate the location change any longer.

For example, referring back to FIG. 16, the BS and/or the LMF and/or the location server may configure/indicate to/instruct the UE to measure a location change (e.g., a movement distance and/or direction) until the end of the idle/inactive mode and report the measurement, when the UE enters the idle/inactive mode.

In a more specific example, the BS and/or the LMF and/or the location server may configure/indicate to/instruct the UE to report information about the user's stride (gait) and/or information about the number of steps the user took during specific time period. For example, the UE may report information measured/obtained through the sensors of the UE to the BS and/or the LMF and/or the location server. For example, the BS and/or the LMF and/or the location server may estimate the movement distance of the UE from the information, and may use the information as data for identifying the user's movement by time.

For example, the BS and/or the LMF and/or the location server may configure/indicate to/instruct the UE to periodically/aperiodically/semi-persistently report only information about the distance moved from a specific (past) time point to a specific (future/past/present) time point (e.g., without information about a direction).

In another example, the BS and/or the LMF and/or the location server may configure/indicate to/instruct the UE to report information about a movement direction only when the movement direction is changed to the BS and/or the LMF and/or the location server, in order to obtain information about the movement direction of the UE.

For example, the direction information may be set/defined as an angle such as an azimuth angle.

For example, to prevent the UE from reporting direction information too often to the BS and/or the LMF and/or the location server even in the event of a slight change of the movement direction of the UE, the BS and/or the LMF and/or the location server may configure/indicate to/instruct the UE to report location information about a location change only when the location change is equal to or greater than a specific threshold (e.g., only when the variation of the azimuth angle of the UE is equal to or greater than a specific threshold).

For example, the specific threshold may be configured/indicated/set by the BS and/or the LMF and/or the location server or may be defined as a default value so that the UE may have prior knowledge of the threshold.

For example, a default value for a time stamp and/or a reference time at which the UE starts sensing/measurement of a location change may be determined based on a reception time of the PRS. For example, the UE may automatically identify or determine the time stamp and/or the reference time as the last reception time of the PRS. This may be a method of determining the time stamp and/or the reference time by the UE, when information about the time stamp and/or the reference time is not configured/indicated/set for/to the UE (explicitly).

Figure 17:
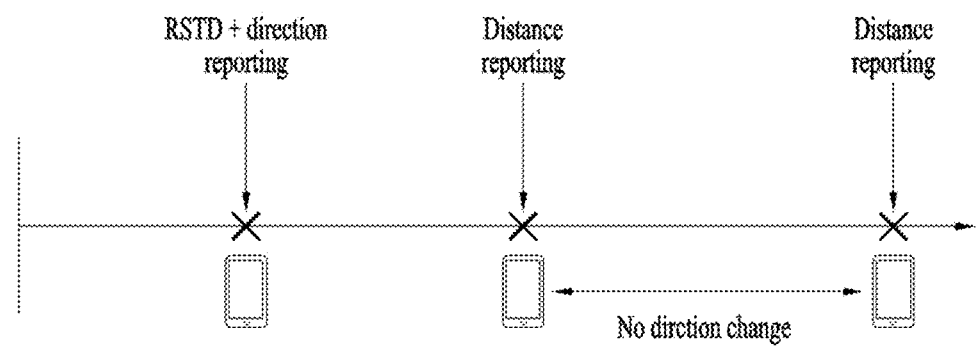
FIG. 17 is a diagram illustrating an exemplary positioning technique according to various embodiments of the present disclosure.

FIG. 17 is a diagram illustrating an exemplary positioning technique according to various embodiments of the present disclosure.

In the example of FIG. 17, it is assumed that the variation of the movement direction and/or angle of the UE is less than a specific threshold (i.e., the movement direction and/or angle of the UE may be considered to be kept unchanged).

Referring to FIG. 17, for example, the BS and/or the LMF and/or the location server may position the UE by the OTDOA scheme.

For example, the UE may then report a reference signal time difference (RSTD) and a movement direction to the BS and/or the LMF and/or the location server to calculate the location of the UE by using the sensors of the UE.

For example, the UE may then report only a movement distance of the UE to the BS and/or the LMF and/or the location server, periodically/aperiodically/semi-persistently.

Various embodiments of the present disclosure may be effectively used, for example, when the UE is placed in a shadowing area and thus it is impossible to position the UE with a cellular network, a GPS, and so on.

For example, on the assumption that the UE enters a shadowing area (e.g., a tunnel), the reliability of a received RS (e.g., PRS) may be relatively low, compared to the outside of the tunnel. For example, the UE may measure and report location-related information only based on the sensors of the UE (i.e., without using the RS) in the shadowing area on that assumption. For example, when the UE moves out of the shadowing area, the UE may again measure and report location-related information based on the sensors of the UE and/or location-related information based on the RS.

In another example, the reliability of a TOA measured in the first path of a received RS may be low for a reason other than a shadowing area, for example, because a line of sight (LoS) path is not reliably secured. For example, the UE may measure and report only location-related information based on the sensors of the UE (i.e., without using the RS) in this situation.

Further, as the BS and/or the LMF and/or the location server perform UE positioning by using the RAT-dependent technique using UTDOA or OTDOA and the RAT-independent technique using the GNSS in combination, the accuracy of positioning the UE may be increased in various embodiments of the present disclosure.

Further, as the BS and/or the LMF and/or the location server identifies the location of the UE by using the PRS and then measures/estimates the location of the UE by using the sensors of the UE, the resulting decrease of the resource overhead for PRS transmission may increase available time/frequency resources for actual PDSCH data transmission and reception in various embodiments of the present disclosure.

3.2. [Proposal #01]—Event-based reporting

Operations based on proposal #01 according to various embodiments of the present disclosure will be described below in detail. Those skilled in the art will clearly understand that all or some of the various embodiments of the present disclosure described below may be combined into other various embodiments of the present disclosure, unless contradicting each other.

3.2.1. Change of Movement Direction of UE

According to various embodiments of the present disclosure, when (autonomously) detecting/identifying that the movement direction of the UE has been changed, the UE may report information about the changed movement direction and/or the previous movement direction and/or the changed movement direction and/or a speed and/or an acceleration to the BS and/or the LMF and/or the location server.

For example, the UE may report information about the distance and/or direction for which and/or in which the UE has moved (from a specific past time) until before identifying that the movement direction has been changed to the BS and/or the LMF and/or the location server.

For example, the BS and/or the LMF and/or the location server may configure/indicate to/instruct the UE to transmit the report.

For example, the BS and/or the LMF and/or the location server may measure/estimate/calculate the location of the UE at a current time based on the report of the UE.

For example, "a change in the movement direction of the UE" may be configured/defined/indicated as a specific event. For example, this specific event may be configured/defined/indicated as an event that triggers the reporting.

For example, upon occurrence of the event of a change in the movement direction of the UE, the UE may transmit only information indicating occurrence of the event to the BS and/or the LMF and/or the location server.

For example, when identifying the occurrence of the event based on the information, the BS and/or the LMF and/or the location server may determine that since the movement direction of the UE has been changed, the BS and/or the LMF and/or the location server may not calculate/estimate/track the location of the UE simply with distance/speed information.

In this case, the BS and/or the LMF and/or the location server may measure/calculate/estimate/track the location of the UE by performing UE positioning again with a positioning scheme involving PRS transmission and/or by indicating to/requesting/instructing the UE to report changed direction information.

For example, the reporting of the UE may be performed in a grant-free manner. That is, for example, the BS may pre-allocate resources to the UE without a UL grant, and when the reporting is necessary, the UE may perform the reporting in one of the allocated resources.

For example, to prevent too frequent occurrences of the event of "a change in the movement direction of the UE" even at a slight change in the movement direction, that is, too often triggering of the reporting, the UE may be configured/indicated to perform the reporting only when the variation of the movement direction is equal to or greater than a specific threshold.

For example, various events such as a change in the speed of the UE and a change in the acceleration of the UE as well as a change in the movement direction of the UE may be defined/configured/indicated. For example, the movement direction of the UE, the speed of the UE, and the acceleration of the UE may be understood as physical quantities related to the movement direction of the UE.

For example, a threshold related to each physical quantity may be configured/indicated. For example, a change in the speed of the UE equal to or greater than the threshold, a change in the acceleration of the UE equal to or greater than the threshold, or the like may be configured/defined/indicated as an event.

3.2.3. Change of Location of UE During RS Measurement/Reporting Time Period

According to various embodiments of the present disclosure, when the variation of the location of the UE exceeds a specific threshold while the UE is obtaining and/or reporting a measurement by using a received RS (e.g., PRS, SRS, CSI-RS, or the like), the UE may report information about the variation of the location of the UE (e.g., a change in the movement distance and/or the direction and/or a specific area) and information indicating that the specific threshold is exceeded to the BS and/or the LMF and/or the location server.

For example, the UE's movement out of the specific area may be defined as the UE's movement from a radius of Xm (X>0).

For example, the radius may be configured/indicated by the BS and/or the LMF and/or the location server.

For example, the radius may conceptually cover a vertical radius as well as a horizontal radius. Therefore, when the UE moves out of the radius of Xm, this may be understood as the UE's movement out of a sphere with the radius of Xm.

For example, the specific area may be considered/defined as indoors and/or outdoors and/or a specific height (e.g., the number of floors of a building, for example, what floor the UE is on).

For example, when the UE moves from the inside to the outside of a certain building or vice versa, the UE may be considered/defined as leaving the specific area. In another example, when the UE moves from the first floor to the second floor in a building and thus the height (from the ground and/or sea level) increases, or when the UE moves from the second floor to the first floor in the building and thus the height (from the ground and/or sea level) decreases, this may be considered/defined as the UE's movement out of the specific area.

For example, considering that it may take a significant (processing) time (several seconds or more) for the UE to obtain and report a PRS measurement, and the UE may move during the time, the above-described embodiments of the present disclosure may provide a method of accurately positioning a UE, especially in this case.

For example, the transmission period of the PRS and the measurement reporting period of the UE may be quite long in consideration of a muting pattern of PRSs transmitted from a plurality of TRPs and/or BSs and/or cells.

For example, when T_PRS=1280 ms (that is, the transmission periodicity of a PRS occasion is 1280 ms) and a 4-bit muting pattern is used, the UE may need to receive a total of four PRS occasions to measure an RSTD/TOA/AOA based on PRSs transmitted from a reference cell and a neighbor cell.

For example, when the UE performs measurement reporting in association/conjunction with this, the UE may perform a measurement in 4 PRS occasions (for about 5 seconds) and report the measurement result. For example, in this case, since the UE may move significantly during the 4 PRS occasions (for about 5 seconds), positioning accuracy may be reduced.

Accordingly, in this case, the UE may need to report information about a change in the location of the UE while the UE is receiving a PRS and reporting a configured/indicated measurement.

That is, considering that it may take a significant (processing) time (several seconds or more) for the UE to receive a PRS and transmit a configured/indicated report, and the UE may move during the time, the above-described embodiments of the present disclosure may provide a method of accurately positioning a UE, especially in this case.

In another example, the report on the location change (and/or area change) of the UE may be configured/indicated regardless of whether the UE receives an RS (e.g., PRS).

For example, when the variation of the location/area of the UE such as movement from the inside to the outside (movement out of a specific building) or a change in a height (e.g., a change in the number of floors) where the UE is located exceeds a specific threshold, the UE may be configured/indicated/instructed to report information about the location change to the B S and/or the LMF and/or the location server.

For example, the specific threshold may be set as a default value and thus known to the UE and/or may be configured/indicated by the BS and/or the LMF and/or the location server.

3.2.3. Difference Estimation

According to various embodiments of the present disclosure, when the difference between location information received from the BS and/or the LMF and/or the location server (i.e., location information about the UE indicated to the UE by the BS and/or the LMF and/or the location server) and location information about the UE measured by the UE is great, the UE may report information related to this event to the BS and/or the LMF and/or the location server.

For example, the UE may indicate its measured location information to the BS and/or the LMF and/or the location server.

For example, the location information about the UE measured by the UE may include information measured through the GPS/GNSS and/or the location information received from the BS and/or the LMF and/or the location server and information obtained through the sensors of the UE.

For example, a great difference between the location information about the UE indicated by the BS and/or the LMF and/or the location server and the location information about the UE measured by the UE may be defined as a difference equal to or greater than a specific threshold.

For example, the specific threshold may be set as a default value and thus known to the UE and/or may be configured/indicated by the BS and/or the LMF and/or the location server.

In the above-described method according to various embodiments of the present disclosure, the BS and/or the LMF and/or the location server may determine the location of the UE more accurately.

3.2.4. PRS (Re)Transmission Request (on Demand PRS)

For example, when a PRS transmission is simply based on an aperiodic resource allocation, PRS transmission resources should be allocated by DCI, which may make actual implementation of the PRS transmission difficult.

In this context, for example, the PRS may be transmitted based on a periodic resource allocation and/or an on-demand resource allocation. According to various embodiments of the present disclosure, an on-demand PRS resource allocation method based on a UE request may be proposed.

According to various embodiments of the present disclosure, the UE may request a PRS retransmission/transmission based on the difference between a PRS measurement value and a UE measurement value or sensing value (e.g., a measurement value or sensing value obtained by sensing at the UE).

For example, because the UE is equipped with various sensors (e.g., an acceleration sensor, a magnetic force sensor, a gyro sensor, and so on), a change in the location of the UE during a predetermined time period may be measured by measuring steps that the UE has taken.

For example, the UE may store measurement information such as RSTD(s)/TOA(s)/TDOA(s)/AOA(s) measured in a PRS received from a specific TRP and/or BS and/or cell at a specific time during a specific time period.

For example, measurement information, such as RSTD(s)/TOA(s)/TDOA(s)/AOA(s), obtained from the latest received PRS (e.g., PRS block/occasion/occasion-group) may be greatly different from a measurement obtained from a previous received PRS (e.g., PRS block/occasion/occasion-group). For example, the difference between a measurement obtained from the latest received PRS and a measurement based on a previous received PRS may be equal to or greater than a specific threshold.

For example, the latest received PRS may be a PRS received from the same TRP and/or BS and/or cell at a previous time point and/or a PRS received on the same TX beam(s) from the same TRP and/or BS and/or cell.

However, the UE may determine based on information obtained from the sensors of the UE that there is almost no movement from a previous PRS reception time to a current time (e.g., a recent reception time of the PRS).

For example, almost no movement from the previous reception time of the PRS to the current time may mean that the location change of the UE from the previous reception time of the PRS to the current time is equal to or less than/less than a specific threshold. For example, when determining based on the sensors of the UE that the user has taken a predetermined number of or fewer steps/fewer steps from the previous reception time of the PRS to the current time, the UE may determine that there is almost no movement from the previous reception time of the PRS to the current time.

In this example, for example, the UE may request a PRS transmission/reception to the BS and/or the LMF and/or the location server, determining that measurement information obtained from the latest received PRS is not appropriate.

For example, because a great difference between a measurement value based on a previous received PRS and a measurement value based on a latest received PRS despite almost no movement of the UE based on the sensors of the UE is not appropriate, the UE may determine that the measurement information obtained from the latest received PRS is not appropriate. In this case, for example, the UE may request a PRS transmission/retransmission to the BS and/or the LMF and/or the location server.

In an opposite example, the UE may determine based on information obtained from the sensors of the UE that the UE has moved for a great (valid/absolute) distance from the previous reception time of the PRS to the latest reception time of the PRS.

For example, a great movement distance from the previous reception time of the PRS to the latest reception time of the PRS may means that the location change of the UE from the previous reception time of the PRS to the latest reception time of the PRS is equal to or greater than a specific threshold. For example, when the user has taken a predetermined number of or more steps from the previous reception time of the PRS to the latest reception time of the PRS, the UE may determine that the movement distance from the previous reception time of the PRS to the latest reception time of the PRS is great.

In this example, for example, when measurement information obtained from the PRS is similar to a previous measurement value obtained from the PRS (e.g., the difference between a measurement value obtained from the latest received PRS and a measurement value obtained from a previous received PRS is less than or equal to/less than a specific threshold), the UE may request a PRS transmission/retransmission to the BS and/or the LMF and/or the location server.

For example, because similar measurement values based on a previous received PRS and based on a latest received PRS despite a great movement of the UE based on the sensors of the UE are not appropriate, the UE may determine that the measurement information obtained from the latest received PRS is not appropriate. In this case, for example, the UE may request a PRS transmission/retransmission to the BS and/or the LMF and/or the location server.

For example, the PRS transmission/retransmission request of the UE may be one or more of the following requests:

change of the TRP and/or the BS and/or the cell that transmits the PRS, and/or change of TX beam(s) carrying the PRS. Those skilled in the art will understand that the change of the TX beam(s) carrying the PRS is a change in PRS transmission resources.

That is, for example, the PRS transmission/retransmission request of the UE may include one or more of information requesting change of the BS and/or the TP and/or information requesting change of TX beam(s).

For example, the information requesting change of the BS and/or the TP may be information requesting PRS transmission from a BS and/or a TP other than the BS and/or the TP that transmitted a previous PRS and/or the BS and/or the TP which has transmitted the latest PRS.

For example, the information requesting change of TX beam(s) may be information requesting PRS transmission on a TX beam (and/or PRS resources) other than a TX beam (and/or PRS resources) that carrying the previous PRS and/or a TX beam (and/or PRS resources) carrying the latest PRS.

For example, when the UE receives PRSs from three TRPs and determines the PRSs not to be suitable for the UE, the UE may request changing of the TRPs and/or a PRS transmission to a corresponding TRP. And/or for example, when the UE determines a TX beam (and/or a PRS resource) corresponding to a current received PRS not to be suitable for the UE, the UE may request changing of the TX beam (and/or the PRS resource). According to various embodiments of the present disclosure, the UE may request a more suitable PRS, which may increase matchability between the UE and the PRS.

For example, the BS and/or the LMF and/or the location server may transmit/retransmit the PRS in response to the PRS transmission/retransmission request, and the UE may receive/re-receive the PRS.

For example, a changed TRP and/or BS and/or cell may transmit/retransmit a PRS in response to a request to change the TRP and/or BS and/or cell that transmits the PRS, and the UE may receive/re-receive the PRS.

For example, the BS and/or the LMF and/or the location server may transmit/retransmit the PRS based on changed TX beam(s) (and/or PRS resources) in response to a request for changing TX beam(s) carrying the PRS, and the UE may receive/re-receive the PRS.

For example, the threshold used to determine a degree to which measurement information obtained from PRSs transmitted at different time points are similar/different may be set as a default value and thus known to the UE and/or may be a value configured/indicated by the BS.

For example, the UE may be indicated to/instructed to report information about the angle and/or posture of the UE. For example, the BS and/or the LMF and/or the location server may indicate to/instruct the UE to report information about the angle and/or posture of the UE.

For example, the UE may report the information about the angle and/or posture of the UE based on the mounted sensors (e.g., a magnetic force sensor and/or a gyroscope sensor) to the BS and/or the LMF and/or the location server. For example, the angle and/or posture of the UE may be the landscape/portrait mode of the UE and/or the angle of the UE with respect to a predetermined reference. For example, the angle of the UE may be an angle with respect to relative and/or absolute coordinates, for example, an angle with respect to the ground, an angle with respect to a normal to the ground, or the like.

For example, as the angle and/or posture of the UE changes, a preferred beam (and/or PRS resource) carrying the PRS may change. Therefore, the preferred PRS transmission beam (and/or PRS resource) may be changed based on the information about the angle and/or posture of the UE.

For example, the information enables the BS to more effectively measure an AOA in a UL signal received from the UE. Consequently, the information may be used in more effectively positioning the UE.

As described before, for example, those skilled in the art will understand that changing TX beam(s) carrying the PRS amounts to changing PRS transmission resources. For example, one TX beam may be mapped to a specific PRS resource. For example, the UE may understand that a TX beam carrying specific PRS resources is determined based on a QCL configuration for the specific PRS resources (e.g., a QCL type-D configuration and the ID of specific RS resources configured as a source of the PRS resources).

Accordingly, requesting for changing a TX beam may be understood as the following two cases by those skilled in the art.

Although the specific PRS resources are identical, changing DL RS resources configured as a QCL type-D source for the PRS resources is requested.

Changing the specific PRS resource to another PRS resource is requested (the corresponding example may include a case in which the same DL RS resources are configured as QCL type-D sources for the two PRS resources).

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

3.3. Initial Network Access and Communication Process

According to various embodiments of the present disclosure, a UE may perform a network access process to perform the above-described/proposed procedures and/or methods. For example, the UE may receive system information and configuration information required to perform the above-described/proposed procedures and/or methods and store the received information in a memory. The configuration information required for various embodiments of the present disclosure may be received by higher-layer signaling (e.g., RRC signaling or MAC signaling).

Figure 18:
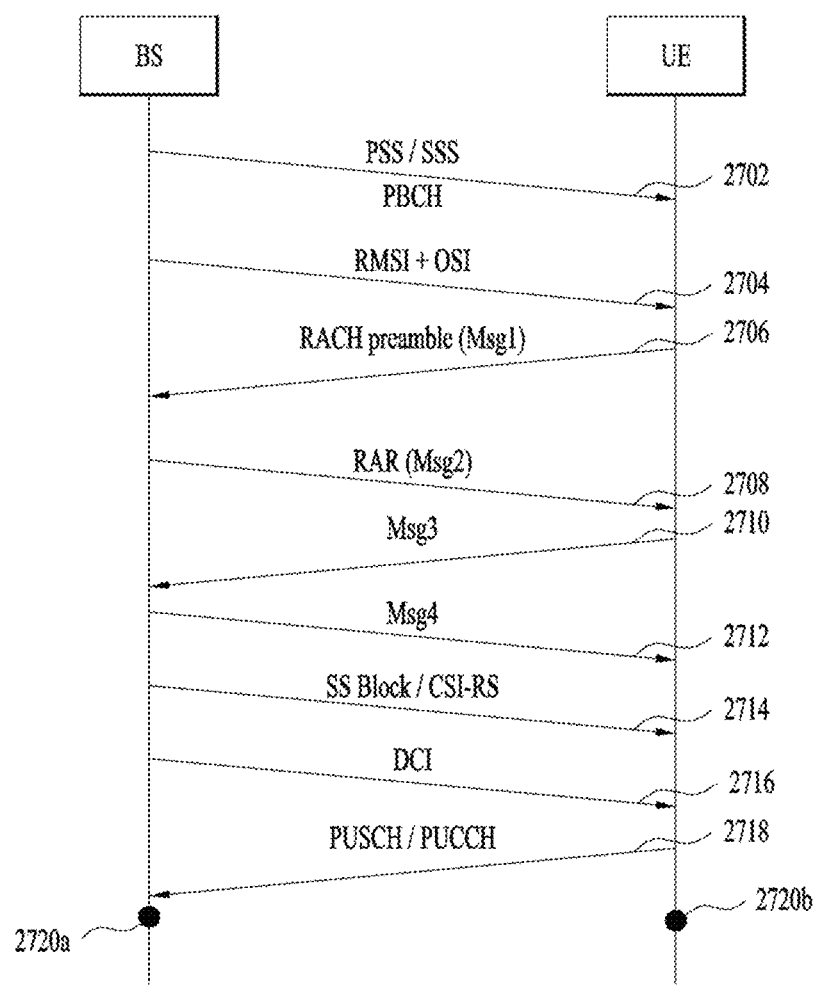
FIG. 18 is a simplified diagram illustrating an initial network access and subsequent communication process according to various embodiments of the present disclosure.

FIG. 18 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 18, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

According to various embodiments of the present disclosure, the RS may be a PRS, and information transmitted on UL may be additional UE location-related information obtained through sensors mounted on the UE according to various embodiments of the present disclosure.

Further, various embodiments of the present disclosure may not be necessarily performed after step 2720a and/or step 2720b. For example, when an RRC connection is established between the UE and the BS after step 2712, the various embodiments of the present disclosure may be performed without and/or in conjunction with step 2714 and the subsequent steps.

3.4. DRX (Discontinuous Reception)

Figure 19:
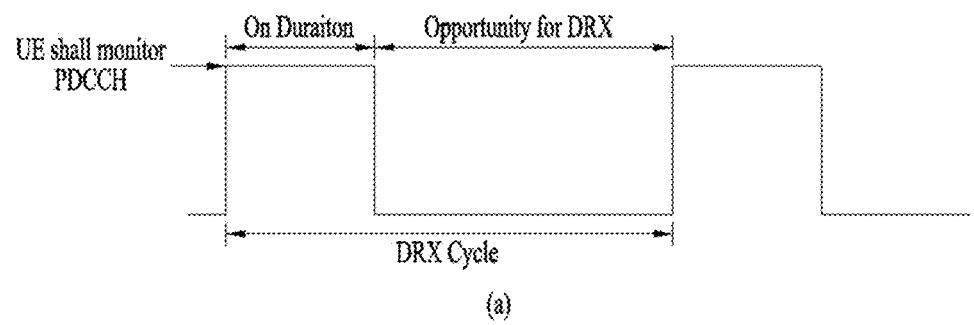
FIG. 19 is a diagram illustrating an exemplary discontinuous reception (DRX) operation according to various embodiments of the present disclosure.
Figure 19:
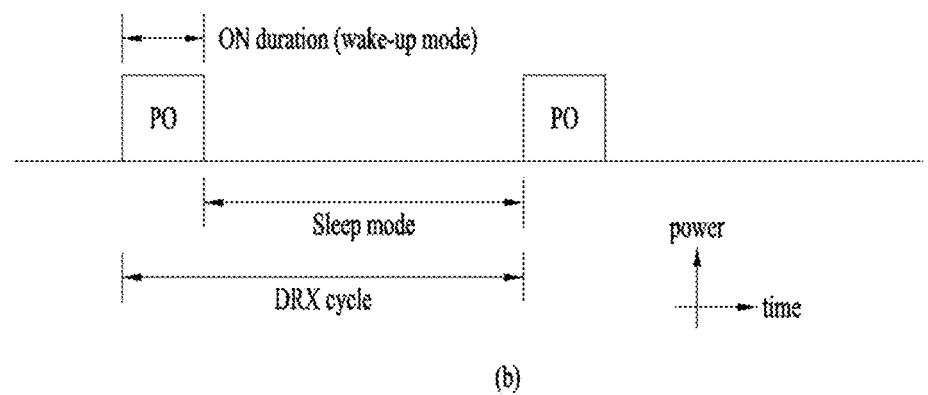

FIG. 19 is a diagram illustrating an exemplary DRX operation according to various embodiments of the present disclosure.

According to various embodiments of the present disclosure, the UE may perform a DRX operation in the aforedescribed/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

3.4.1. RRC_CONNECTED DRX

In in the RRC_CONNECTED state, DRX is used to receive a PDCCH discontinuously. DRX in the RRC_CONNECTED state is referred to as RRC_CONNECTED DRX).

Referring to FIG. 19(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 10

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

3.4.2. RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 19(b), DRX may be configured for discontinuous reception of a paging signal. The UE may receive DRX configuration information from the B S by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

Those skilled in the art will understand clearly that above-described initial access process and/or DRX operation may be combined with the contents of clause 1 to clause 3 described before to constitute other various embodiments of the present disclosure.

Figure 20:
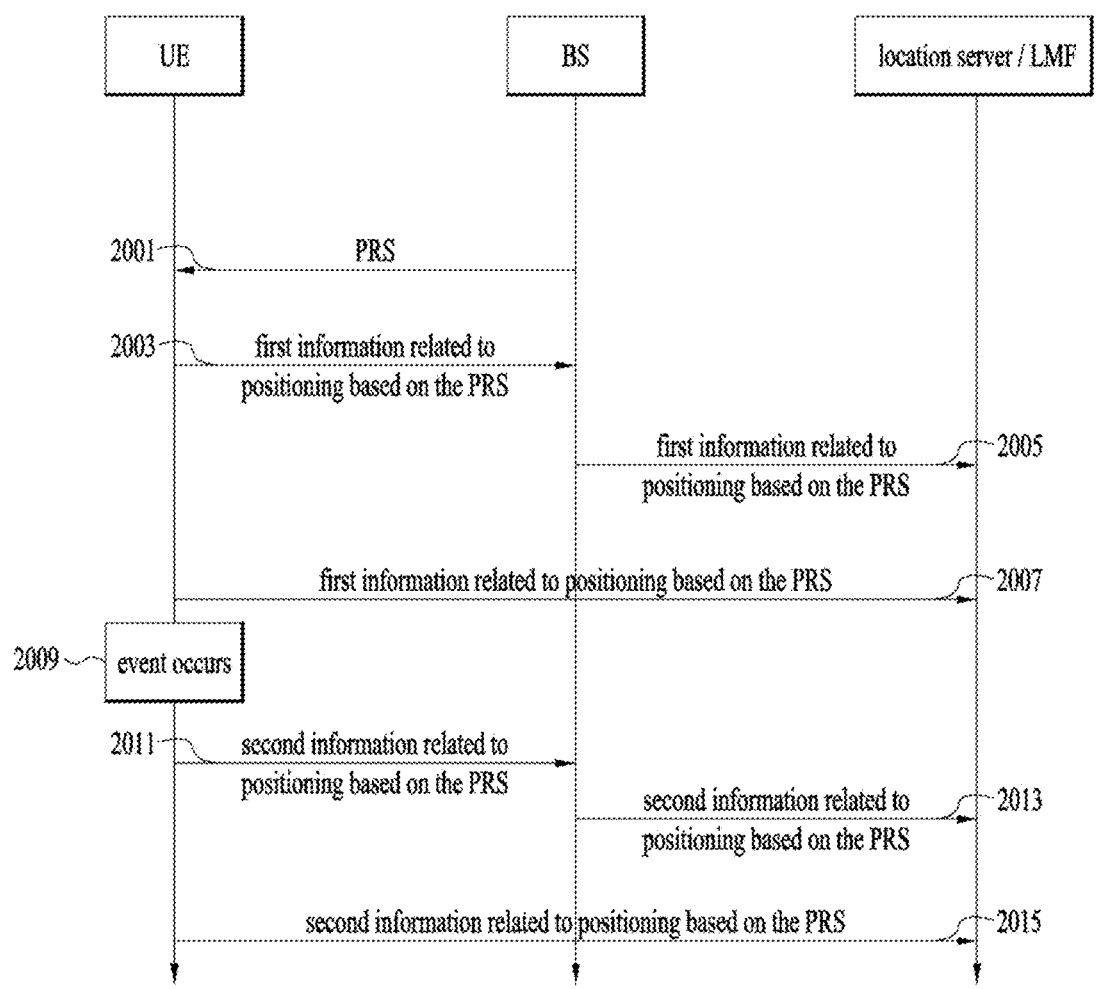
FIG. 20 is a simplified diagram illustrating a method of operating a UE and network nodes according to various embodiments of the present disclosure.

FIG. 20 is a simplified diagram illustrating a signal flow for a method of operating a UE and network nodes according to various embodiments of the present disclosure.

Referring to FIG. 20, in operation 2001 according to an exemplary embodiment, a BS may transmit a PRS to a UE, and the UE may receive the PRS.

In operation 2003 according to an exemplary embodiment, the UE may transmit first information related to positioning based on the PRS to the BS, and the BS may receive the first information. In operation 2005 according to an exemplary embodiment, the BS may transmit the first information to a location server and/or an LMF, and the location server and/or the LMF may receive the first information.

In operation 2007 according to an exemplary embodiment, the BS may transmit the first information related to positioning based on the PRS to the location server and/or the LMF, and the location server and/or the LMF may receive the first information. In this case, operation 2003 and/or operation 2005 according to an exemplary embodiment may be skipped.

On the contrary, operation 2007 according to an exemplary embodiment may be skipped. In this case, operation 2003 and/or operation 2005 according to an exemplary embodiment may be performed.

That is, operation 2003 and/or operation 2005 according to an exemplary embodiment and operation 2007 according to an exemplary embodiment may be selectively performed.

Upon occurrence of at least one of predetermined events in operation 2009 according to an exemplary embodiment, one or more of operation 2011, operation 2013, and/or operation 2005 according to an exemplary embodiment may be performed.

In operation 2011 according to an exemplary embodiment, the UE may transmit second information related to positioning based on one or more sensors included in the UE to the BS, and the BS may receive the first information. In operation 2013 according to an exemplary embodiment, the BS may transmit the second information to a location server and/or an LMF, and the location server and/or the LMF may receive the second information.

In operation 2015 according to an exemplary embodiment, the UE may transmit the second information related to positioning based on the one or more sensors included in the UE to the location server and/or the LMF, and the location server and/or the LMF may receive the second information. In this case, operation 2011 and/or operation 2013 according to an exemplary embodiment may be skipped.

On the contrary, operation 2015 according to an exemplary embodiment may be skipped. In this case, operation 2011 and/or operation 2013 according to an exemplary embodiment may be performed.

That is, operation 2011 and/or operation 2013 according to an exemplary embodiment and operation 2015 according to an exemplary embodiment may be selectively performed.

Figure 21:
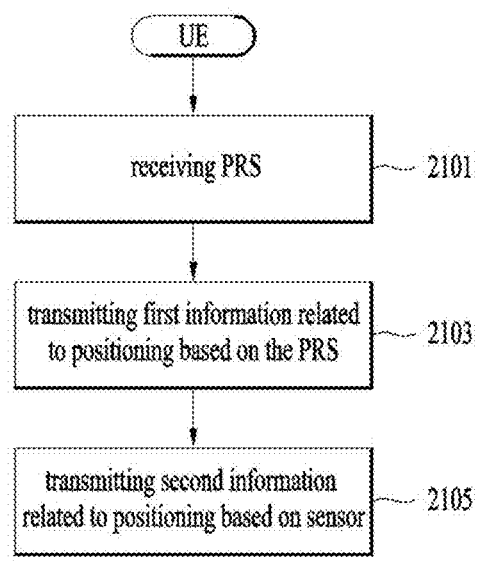
FIG. 21 is a flowchart illustrating a method of operating a UE according to various embodiments of the present disclosure.

FIG. 21 is a flowchart illustrating a method of operating a UE according to various embodiments of the present disclosure.

Referring to FIG. 21, in operation 2101 according to an exemplary embodiment, the UE may receive a PRS.

In operation 2103 according to an exemplary embodiment, the UE may transmit first information related to positioning based on the PRS.

In operation 2105 according to an exemplary embodiment, the UE may transmit second information related to positioning based on one or more sensors included in the UE.

For example, the second information may be transmitted based on occurrence of at least one of predetermined events.

For example, the predetermined events may include (i) a first event including identification of a change in a physical quantity related to a movement direction of the UE based on one or more sensors for a predetermined time period.

Figure 22:
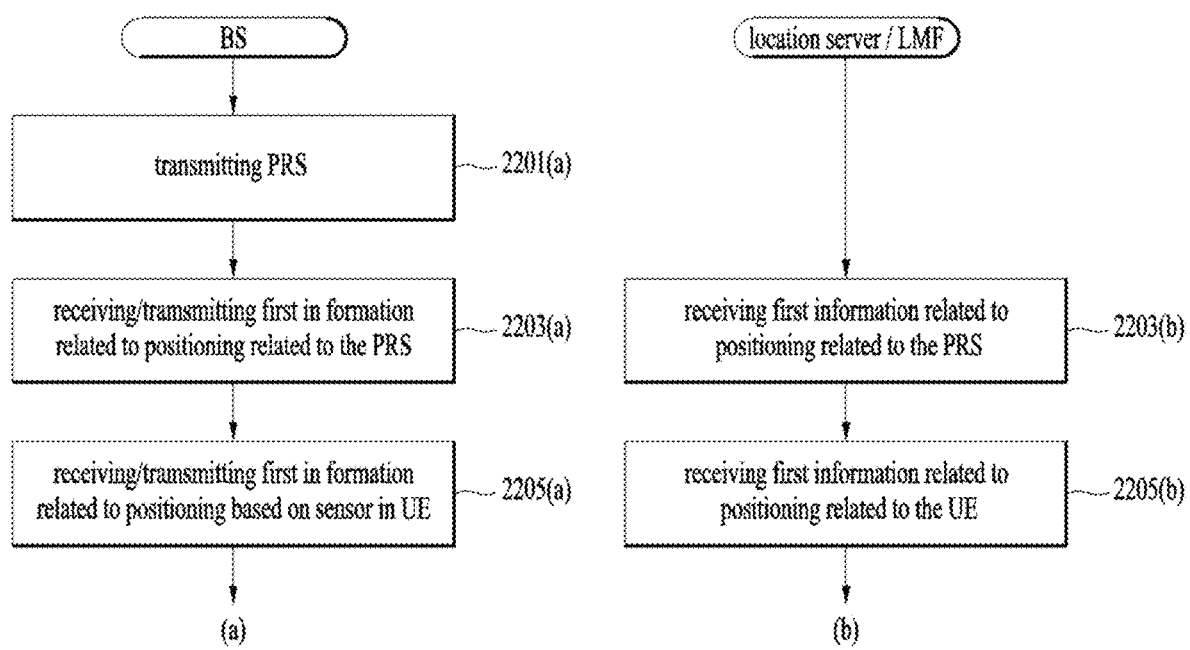
FIG. 22 is a flowchart illustrating a method of operating network nodes according to various embodiments of the present disclosure.

FIG. 22 is a flowchart illustrating a method of operating network nodes according to various embodiments of the present disclosure.

Referring to FIG. 22(*a*), in operation 2201(*a*) according to an exemplary embodiment, the BS may transmit a PRS.

In operation 2203(*a*) according to an exemplary embodiment, the BS may receive first information related to UE positioning, which is related to the PRS, and transmit the first information to a location server and/or an LMF.

In operation 2205(*a*) according to an exemplary embodiment, the BS may receive second information related to positioning, which is related to one or more sensors included in the UE, and transmit the second information to the location server and/or the LMF.

For example, the second information may be received based on occurrence of at least one of predetermined events.

For example, the predetermined events may include (i) a first event including identification of a change in a physical quantity related to a movement direction of the UE based on one or more sensors for a predetermined time period.

Referring to FIG. 22(*b*), in operation 2203(*b*) according to an exemplary embodiment, the location server and/or the LMF may receive first information related to UE positioning, which is related to a PRS, from the UE or the BS. For example, when the first information is received (directly) from the UE, the first information may not be received from the BS. In this case, operation 2203(*a*) according to an exemplary embodiment may be skipped. In an opposite example, when the first information is received from the BS, the first information may not be received (directly) from the UE. That is, (direct) reception of the first information from the UE and reception of the first information from the BS may be selectively performed.

In operation 2205(*b*) according to an exemplary embodiment, the location server and/or the LMF may receive second information related to UE positioning, which is related to sensors included in the UE, from the UE or the BS. For example, when the second information is received (directly) from the UE, the second information may not be received from the BS. In this case, operation 2205(*a*) according to an exemplary embodiment may be skipped. In an opposite example, when the second information is received from the BS, the second information may not be received (directly) from the UE. That is, (direct) reception of the second information from the UE and reception of the second information from the BS may be selectively performed.

For example, the second information may be received based on occurrence of at least one of predetermined events.

For example, the predetermined events may include (i) a first event including identification of a change in a physical quantity related to a movement direction of the UE based on one or more sensors for a predetermined time period.

A more specific operation of a BS and/or a UE according to various embodiments of the present disclosure may be described and performed based on the afore-described clause 1 to clause 3.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments of the Present Disclosure 4.1. Exemplary Configurations of Devices to which Various Embodiments of the Present Disclosure are Applied FIG. 23 is a diagram illustrating devices that implement various embodiments of the present disclosure.

Figure 23:
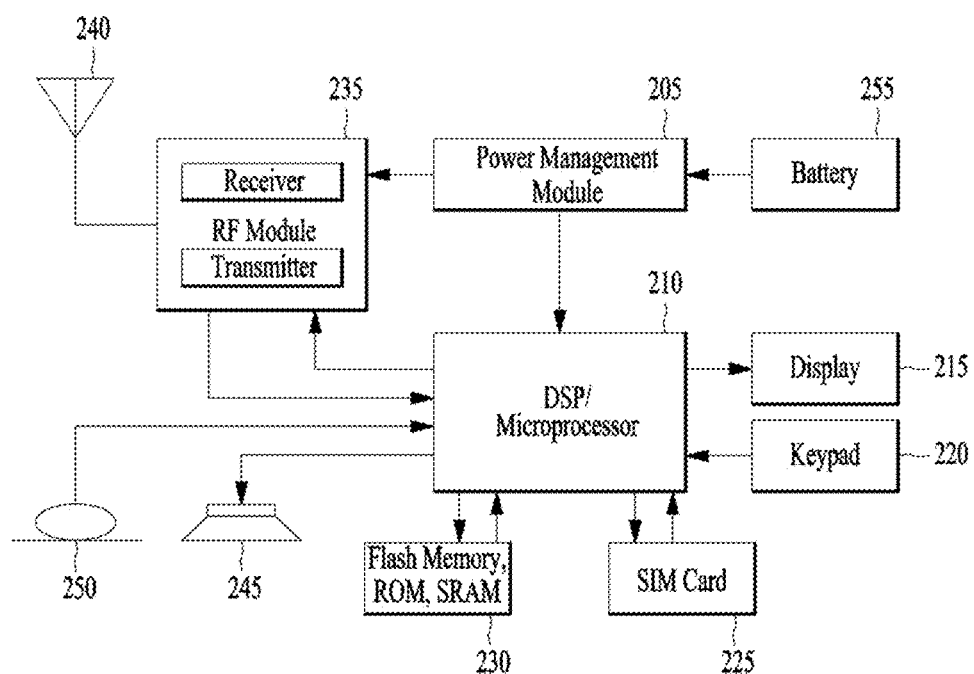
FIG. 23 is a block diagram illustrating an apparatus for implementing various embodiments of the present disclosure.

The devices illustrated in FIG. 23 may be a UE and/or a BS (e.g., eNB or gNB) adapted to perform the afore-described mechanisms, or any devices performing the same operation.

Referring to FIG. 23, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 23 may illustrate a UE including a receiver 235 configured to receive a request message from a network and a transmitter 235 configured to transmit transmission/reception timing information to the network. The transmitter and the receiver may form the transceiver 235. The UE may further include the processor 210 coupled to the transceiver 235.

Further, FIG. 23 may illustrate a network device including a transmitter 235 configured to transmit a request message to a UE and a receiver 235 configured to receive transmission and reception timing information from the UE. The transmitter and the receiver may form the transceiver 235. The network further includes the processor 210 coupled to the transmitter and the receiver. The processor 210 may calculate a latency based on the transmission and reception timing information.

According to various embodiments of the present disclosure, the processors included in the UE (or a communication device included in the UE) and the BS (or a communication device included in the BS) may operate as follows by controlling memories.

According to various embodiments of the present disclosure, a UE or a BS may include at least one transceiver, at least one memory, and at least one processor connected to the at least one transceiver and the at least one memory. The at least one memory may store instructions which cause the at least one processor to perform the following operation.

A communication device included in the UE or the BS may be configured to the at least one processor and the at least one processor. The communication device may be configured to include the at least one transceiver or may be connected to the at least one transceiver without including the at least one transceiver.

According to various embodiments of the present disclosure, the at least one processor included in the UE (or the at least one processor of the communication device included in the UE) may receive a PRS.

According to various embodiments of the present disclosure, the at least one processor included in the UE may transmit first information related to UE positioning based on the PRS.

According to various embodiments of the present disclosure, the at least one processor included in the UE may transmit second information related to positioning based on one or more sensors included in the UE.

For example, the second information may be transmitted based on occurrence of at least one of predetermined events.

For example, the predetermined events may include (i) a first event including identification of a change in a physical quantity related to a movement direction of the UE based on one or more sensors for a predetermined time period.

More specific operations of the processor included in the BS and/or the UE according to various embodiments of the present disclosure may be described and performed based on the afore-described clause 1 to clause 3.

Unless contradicting with each other, various embodiments of the present disclosure may be implemented in combination. For example, (the processor and so on included in) the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
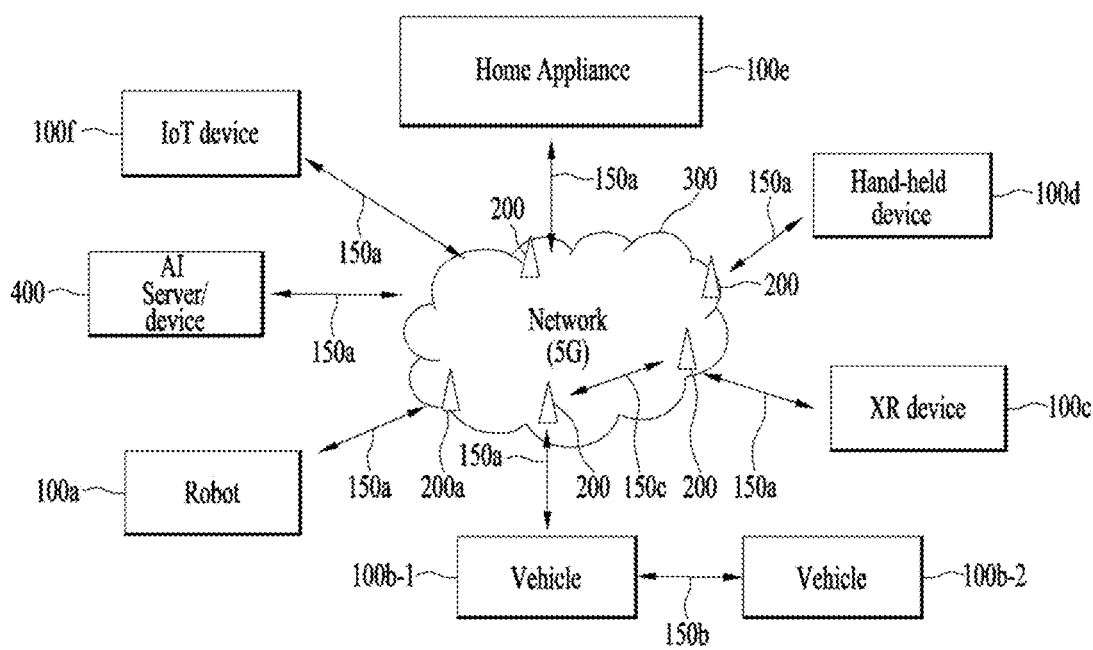
FIG. 24 is a diagram illustrating a communication system to which various embodiments of the present disclosure are applicable.

FIG. 24 illustrates an exemplary communication system to which various embodiments of the present disclosure are applied.

Referring to FIG. 24, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 25:
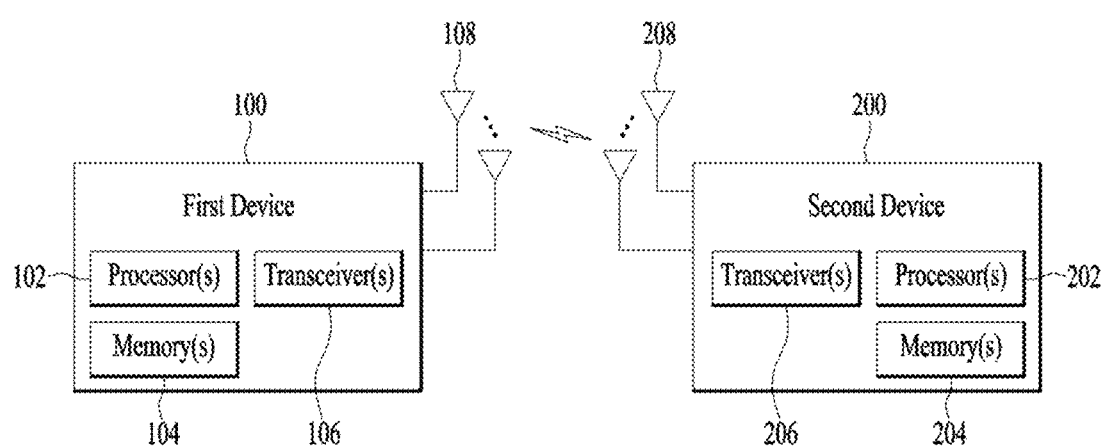
FIG. 25 is a block diagram illustrating wireless devices to which various embodiments of the present disclosure are applicable.

4.2.1 Example of Wireless Devices to which Various Embodiments of the Present Disclosure are Applied FIG. 25 illustrates exemplary wireless devices to which various embodiments of the present disclosure are applicable.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 26:
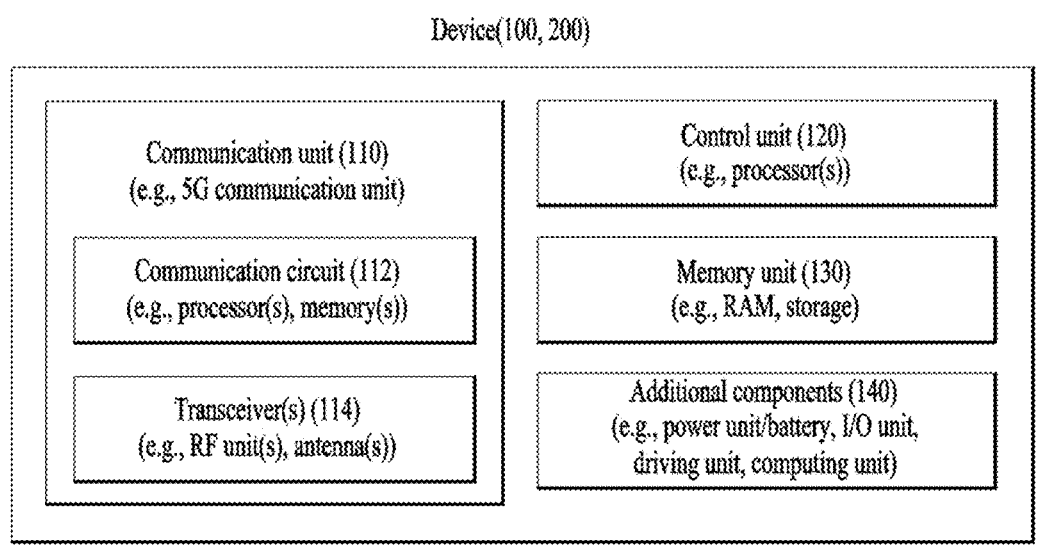
FIG. 26 is a block diagram illustrating another example of wireless devices to which various embodiments of the present disclosure are applicable.

4.2.2. Example of Using Wireless Devices to which Various Embodiments of the Present Disclosure are Applied FIG. 26 illustrates other exemplary wireless devices to which various embodiments of the present disclosure are applied. The wireless devices may be implemented in various forms according to a use case/service (see FIG. 24).

Referring to FIG. 26, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
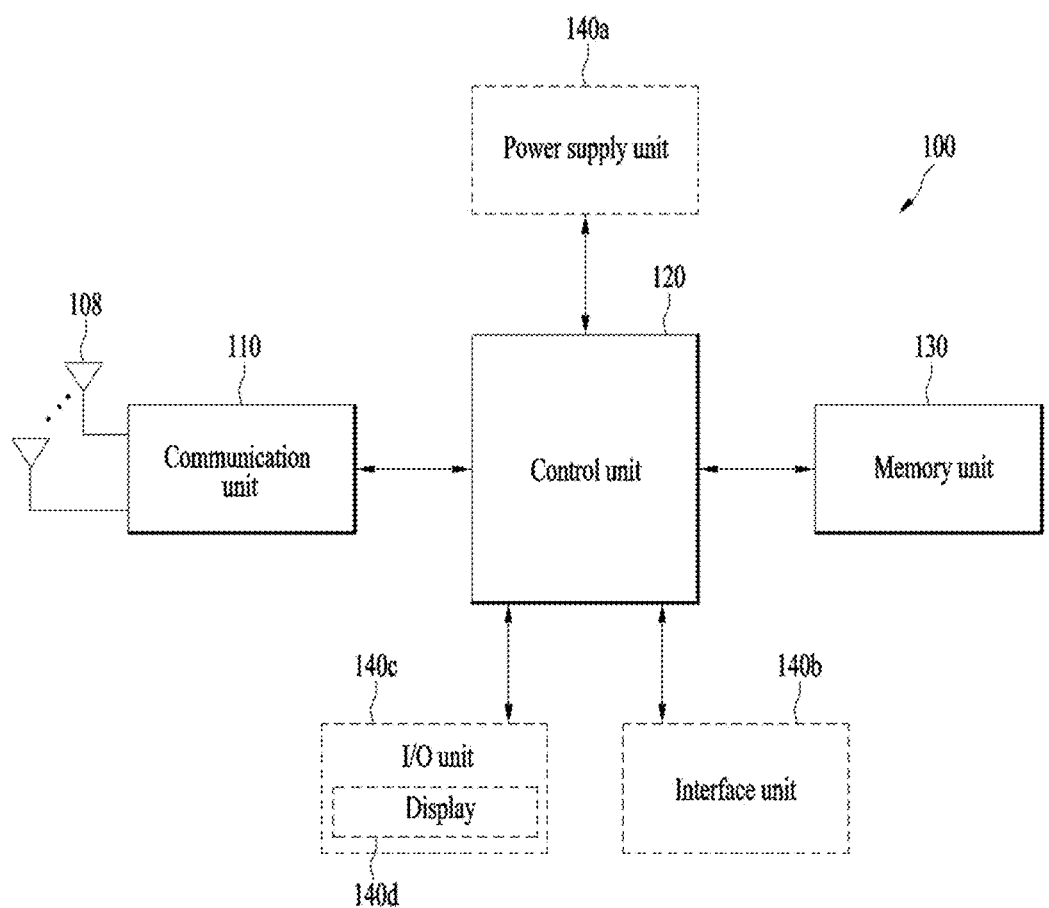
FIG. 27 is a block diagram illustrating a portable device applied to various embodiments of the present disclosure.

4.2.3. Example of Portable Device to which Various Embodiments of the Present Disclosure are Applied FIG. 27 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 28:
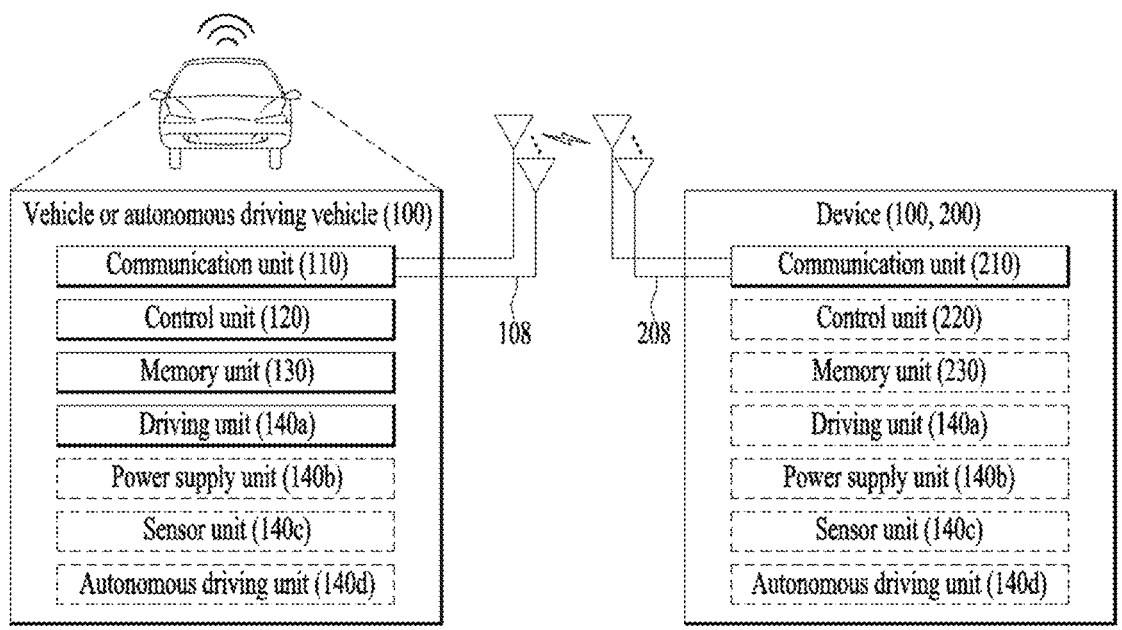
FIG. 28 is a block diagram illustrating a vehicle or an autonomous driving vehicle, which is applied to various embodiments of the present disclosure.

FIG. 28 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 29:
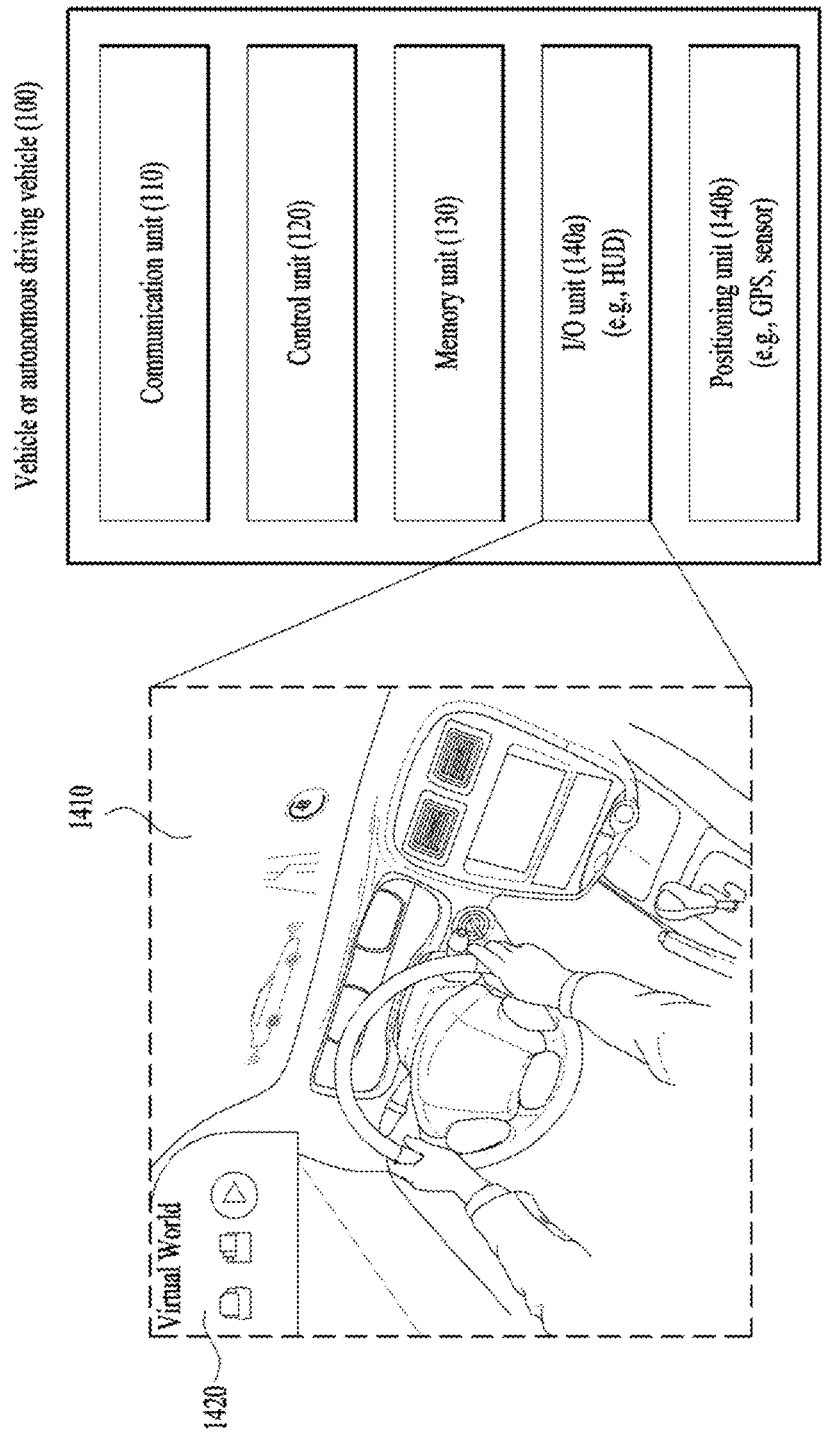
FIG. 29 is a block diagram illustrating a vehicle applied to various embodiments of the present disclosure.

4.2.5. Example of AR/VR and Vehicle to which Various Embodiments of the Present Disclosure FIG. 29 illustrates an exemplary vehicle to which various embodiments of the present disclosure are applied. The vehicle may be implemented as a transportation means, a train, an aircraft, a ship, or the like.

Referring to FIG. 29, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 26.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method of a user equipment (UE) in a wireless communication system, the method comprising:
receiving, from a base station (BS), a synchronization signal block (SSB) including a primary synchronization signal (PSS), a secondary synchronization signal (SSS), and a physical broadcast channel (PBCH);
performing synchronization with the BS based on the PSS and the SSS;
obtaining system information based on the PBCH;
performing a random access procedure with the BS;
receiving a first positioning reference signal (PRS);
receiving a second PRS after receiving the first PRS;
transmitting first information related to positioning of the UE based on the first PRS;
transmitting second information related to the positioning based on at least one sensor included in the UE;
obtaining third information related to the positioning of the UE based on the second PRS; and
transmitting information requesting transmission of a third PRS based on a predetermined condition related to the first information and the third information being satisfied,
wherein the second information is transmitted based on occurrence of at least one of predetermined events, and
wherein the predetermined events comprise (i) a first event comprising identification of a change of a physical quantity related to a movement direction of the UE based on the at least one sensor within a predetermined time period.

2. The method of claim 1, wherein the change of the physical quantity related to the movement direction of the UE is identified based on an amount of the change of the physical quantity related to the movement direction of the UE being equal to or greater than a predetermined first threshold, and
wherein the change of the physical quantity related to the movement direction of the UE is not identified based on the amount of the change of the physical quantity being less than the predetermined first threshold.

3. The method of claim 1, wherein the predetermined events further comprise (ii) a second event comprising identification of a change of a location of the UE based on the at least one sensor within the predetermined time period.

4. The method of claim 3, wherein the change of the location of the UE is identified based on an amount of the change of the location of the UE being equal to or greater than a predetermined second threshold, and
wherein the change of the location of the UE is not identified based on the amount of the change of the location of the UE being less than the predetermined second threshold.

5. The method of claim 1, wherein the predetermined events further comprise (iii) a third event comprising a difference between received information about a location of the UE and information about the location of the UE obtained based on the at least one sensor being greater than or equal to a predetermined third threshold.

6. The method of claim 1, wherein the information requesting transmission of the third PRS comprises at least one of (i) information requesting change of the base station or a transmission reception point (TRP) or (ii) information requesting change of a quasi co-location (QCL) configuration,
wherein the information requesting change of the BS or the TRP is related to at least one of (i) requesting transmission of the third PRS to a BS other than a BS which has transmitted at least one of the first PRS or the second PRS or (ii) requesting transmission of the third PRS to a TRP other than a TRP which has transmitted at least one of the first PRS or the second PRS, and wherein the information requesting change of the QCL configuration is related to requesting transmission of the third PRS based on a QCL configuration other than at least one of a QCL configuration related to transmission of the first PRS or a QCL configuration related to transmission of the second PRS.

7. The method of claim 1, wherein the predetermined condition comprises:
  (i) a first condition comprising a difference between the first information and the third information being less than a predetermined fourth threshold, and an amount of change of location of the UE from a reception time of the first PRS to a reception time of the second PRS identified based on the at least one sensor being equal to or greater than a predetermined fifth threshold; and
  (ii) a second condition comprising the difference between the first information and the third information being equal to or greater than the predetermined fourth threshold, and the amount of change of location of the UE from the reception time of the first PRS to the reception time of the second PRS identified based on the at least one sensor being less than the predetermined fifth threshold.

8. The method of claim 1, wherein the predetermined time period starts from a reception time of the first PRS.

9. The method of claim 1, further comprising receiving information requesting transmission of the second information related to a change of location of the UE from a starting time of one of idle mode and inactive mode of the UE to a predetermined time point,
  wherein the second information is transmitted in response to the information requesting the transmission of the second information.

10. The method of claim 9, wherein the predetermined time point is a time point at which the one mode ends.

11. An apparatus configured to operate in a wireless communication system, the apparatus comprising:
  a memory; and
  at least one processor coupled to the memory,
  wherein the at least one processor is configured to:
    receive, from a base station (BS), a synchronization signal block (SSB) including a primary synchronization signal (PSS), a secondary synchronization signal (SSS), and a physical broadcast channel (PBCH);
    perform synchronization with the BS based on the PSS and the SSS;
    obtain system information based on the PBCH;
    perform a random access procedure with the BS;
    receive a first positioning reference signal (PRS);
    receive a second PRS after receiving the first PRS;
    transmit first information related to positioning of the apparatus based on the first PRS;
    transmit second information related to the positioning based on at least one sensor included in the apparatus;
    obtain third information related to the positioning of the apparatus based on the second PRS; and
    transmit information requesting transmission of a third PRS based on a predetermined condition related to the first information and the third information being satisfied,
  wherein the second information is transmitted based on occurrence of at least one of predetermined events, and
  wherein the predetermined events comprise (i) a first event comprising identification of a change of a physical quantity related to a movement direction of the apparatus based on the at least one sensor within a predetermined time period.

12. The apparatus of claim 11, wherein the apparatus communicates with at least one of a user equipment (UE), a network, or an autonomous driving vehicle other than a vehicle comprising the apparatus.

13. An apparatus configured to operate in a wireless communication system, the apparatus comprising:
  at least one processor; and
  at least one memory storing at least one instruction which causes the at least one processor to perform a method, wherein the method comprises:
    receiving, from a base station (BS), a synchronization signal block (SSB) including a primary synchronization signal (PSS), a secondary synchronization signal (SSS), and a physical broadcast channel (PBCH);
    performing synchronization with the BS based on the PSS and the SSS;
    obtaining system information based on the PBCH;
    performing a random access procedure with the BS;
    receiving a first positioning reference signal (PRS);
    receiving a second PRS after receiving the first PRS;
    transmitting first information related to positioning of the apparatus based on the first PRS;
    transmitting second information related to the positioning based on at least one sensor included in the apparatus;
    obtaining third information related to the positioning of the apparatus based on the second PRS; and
    transmitting information requesting transmission of a third PRS based on a predetermined condition related to the first information and the third information being satisfied,
  wherein the second information is transmitted based on occurrence of at least one of predetermined events, and
  wherein the predetermined events comprise (i) a first event comprising identification of a change of a physical quantity related to a movement direction of the apparatus based on the at least one sensor within a predetermined time period.

* * * * *